(12) United States Patent
Sharifzadeh et al.

(10) Patent No.: US 12,738,833 B2
(45) Date of Patent: Sep. 15, 2026

(54) MULTILEVEL ELECTRIC POWER CONVERTER

(71) Applicant: ECOLE DE TECHNOLOGIE SUPERIEURE, Montréal (CA)

(72) Inventors: Mohammad Sharifzadeh, Montréal (CA); Kamal Al-Haddad, Montréal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 301 days.

(21) Appl. No.: 18/578,445

(22) PCT Filed: Jul. 11, 2022

(86) PCT No.: PCT/CA2022/051075
§ 371 (c)(1),
(2) Date: Jan. 11, 2024

(87) PCT Pub. No.: WO2023/283725
PCT Pub. Date: Jan. 19, 2023

(65) Prior Publication Data

US 2024/0297569 A1 Sep. 5, 2024

Related U.S. Application Data

(60) Provisional application No. 63/220,697, filed on Jul. 12, 2021.

(51) Int. Cl.
*H02M 1/00* (2007.01)
*H02M 7/5387* (2007.01)

(52) U.S. Cl.
CPC ..... *H02M 1/0048* (2021.05); *H02M 7/53871* (2013.01)

(58) Field of Classification Search
CPC ............. H02M 1/0048; H02M 7/4835; H02M 7/53871
See application file for complete search history.

(56) References Cited

U.S. PATENT DOCUMENTS 9,923,484 B2 * 3/2018 Vahedi .................. H02M 7/537
10,759,287 B2 * 9/2020 Vahedi ................ H02M 7/4837
(Continued)

FOREIGN PATENT DOCUMENTS

KR 20180017458 A * 2/2018 ............ H02M 7/483
WO 2019/204935 10/2019
(Continued)

OTHER PUBLICATIONS

Machine Translation KR-20180017458-A (Year: 2018).*

*Primary Examiner* — Thienvu V Tran
*Assistant Examiner* — Yahveh Comas Torres
(74) *Attorney, Agent, or Firm* — NORTON ROSE FULBRIGHT CANADA LLP

(57) ABSTRACT

There is described a power converter for transforming electrical power between direct current (DC) power and alternating current (AC) power. The power converter has a first stage comprising a first branch having a first pair of series-connected switches, a second branch having a second pair of series-connected switches, and a capacitor connected between the first and second branches; a second stage comprising a third branch having a first plurality of series-connected switches, a fourth branch having a second plurality of series-connected switches, and a plurality of capacitors connected between the third and fourth branches at respective connection points located between intermediate switches of the first and second pluralities of series-connected switches; and a connection branch coupling the first stage and the second stage.

18 Claims, 22 Drawing Sheets

(56) References Cited

U.S. PATENT DOCUMENTS

| | | | | |
|---|---|---|---|---|
| 12,027,992 | B2 * | 7/2024 | Arazm | H02M 7/797 |
| 2005/0127853 | A1 * | 6/2005 | Su | H02M 7/4837 318/108 |
| 2011/0280052 | A1 * | 11/2011 | Al-Haddad | H02M 7/483 363/84 |
| 2021/0344279 | A1 * | 11/2021 | Sharifzadeh | H02M 7/4833 |
| 2022/0181984 | A1 * | 6/2022 | Vahedi | H02M 3/33584 |
| 2023/0024492 | A1 * | 1/2023 | Arazm | H02M 7/4835 |

FOREIGN PATENT DOCUMENTS

| | | | |
|---|---|---|---|
| WO | 2020/047677 | 3/2020 | |
| WO | 2021/119850 | 6/2021 | |
| WO | WO-2021119850 A1 * | 6/2021 | H02M 7/5395 |

* cited by examiner 100
102
110
112
114
116
118
120
122
124
126
128
130
132
132
140
Vdc
S1
S2
S3
S4
S5
S6
S7
S8
S9
S10
C1
C2
C3
V1
V2
V3
AC Load $V_{out} = 0$ $V_{out} = 0$ $V_{out} = +V_{dc}/8$ $V_{out} = +V_{dc}/8$ $V_{out} = +2V_{dc}/8$ $V_{out} = +2V_{dc}/8$ $V_{out} = +2V_{dc}/8$ $V_{out} = +3V_{dc}/8$ AC Load
$V_{dc}$
$S_1$
$S_2$
$S_3$
$S_4$
$S_5$
$S_6$
$S_7$
$S_8$
$S_9$
$S_{10}$
$C_1$
$C_2$
$C_3$
$V_1$
$V_2$
$V_3$ $V_{out} = +4V_{dc}/8$ $V_{out} = +3V_{dc}/8$ $V_{out} = +3V_{dc}/8$ $V_{out} = +3V_{dc}/8$ $V_{out} = +5V_{dc}/8$ $V_{out} = +4V_{dc}/8$ $V_{out} = +4V_{dc}/8$ $V_{out} = +4V_{dc}/8$ $V_{dc}$
$S_1$
$S_2$
$S_3$
$S_4$
$S_5$
$S_6$
$S_7$
$S_8$
$S_9$
$S_{10}$
$C_1$
$C_2$
$C_3$
$V_1$
$V_2$
$V_3$
AC Load $V_{out} = +6V_{dc}/8$ $V_{out} = +7V_{dc}/8$ $V_{out} = +5V_{dc}/8$ $V_{out} = +7V_{dc}/8$ $V_{out} = +V_{dc}/8$ $V_{out} = +5V_{dc}/8$ $V_{out} = +6V_{dc}/8$ $V_{out} = +V_{dc}/8$ $V_{out} = +5V_{dc}/8$ $V_{out} = +6V_{dc}/8$

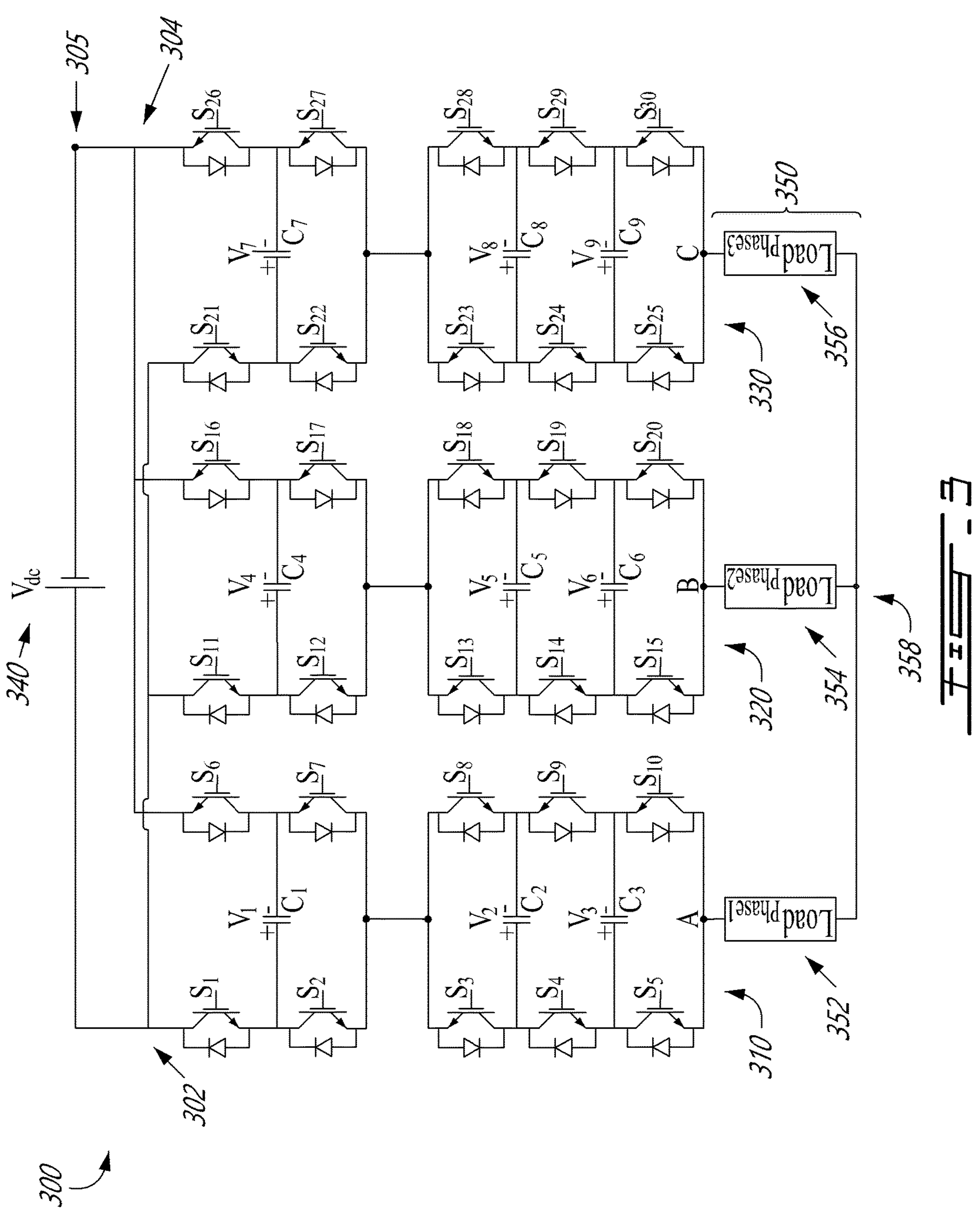
300
302
304
305
310
320
330
340
350
352
354
356
358
$V_{dc}$
A
B
C

612
Voltage (v)
800
400
0
0
2.5
5
7.5
10
12.5
15
$V_{dc}$
614
400
200
$V_1$
$V_4$
$V_7$
616
200
100
$V_2$
$V_5$
$V_8$
618
100
50
$V_3$
$V_6$
$V_9$
Time (s)

622
10
10.05
10.1
624
626
0.05
628
Time (s)

632
634
636
638
Current (A)
$V_{dc}$
$I_{c1}$
$I_{c4}$
$I_{c7}$
$I_{c5}$
$I_{c8}$
$I_{c3}$
$I_{c6}$
$I_{c9}$
10
0
-10
0
2.5
5
7.5
10
12.5
15
Time (s)

642
5
-5
10
10.05
10.1
$I_{c2}$
644

712
$V9L_a$
714
$V9L_b$
716
$V9L_c$
Time (s)

722
Fundamental (60Hz)= 170.6, THD= 17.25%
$V9L_a$
724
Fundamental (60Hz)= 170.7, THD= 17.32%
$V9L_b$
726
Fundamental (60Hz)= 170.8, THD= 17.37%
$V9L_c$
Magnitude (% of Fundamental)
Harmonic order 732
Vline$_a$
734
Vline$_b$
736
Vline$_c$
400
200
0
-200
-400
10 10.01 10.02 10.03 10.04 10.05 10.06 10.07 10.08 10.09 10.1
Time (s)

742
744
746
Magnitude (% of Fundamental)
Fundamental (60Hz)= 295.5, THD= 15.50%
VL$_{ab}$
Fundamental (60Hz)= 296, THD= 15.52%
VL$_{bc}$
Fundamental (60Hz)= 296, THD= 15.53%
VL$_{ac}$
5 4 3 2 1 0
1 3 5 7 9 11 13 15 17 19 21 23 25 27 29 31 33 35 37 39 41 43 45 47 49
Harmonic order 752
Vphase$_a$
200
0
-200
10
10.01
10.02
10.03
10.04
10.05
10.06
10.07
10.08
10.09
10.1
754
Vphase$_b$
756
Vphase$_c$
Time (s)

762
Fundamental (60Hz)= 170.5, THD= 15.52%
Vph$_a$
764
Fundamental (60Hz)= 170.8, THD= 15.50%
Vph$_b$
766
Fundamental (60Hz)= 170.8, THD= 15.53%
Vph$_c$
Magnitude (% of Fundamental)
Harmonic order
1 3 5 7 9 11 13 15 17 19 21 23 25 27 29 31 33 35 37 39 41 43 45 47 49

772
774
776
$I_a$
$I_b$
$I_c$
Time (s)

782
784
786
Fundamental (60Hz)= 4.189, THD= 1.35%
Fundamental (60Hz)= 4.195, THD= 1.44%
Fundamental (60Hz)= 4.195, THD= 1.39%
Magnitude (% of Fundamental)
Harmonic order 812
813
Voltage (v)
800
400
0
0 2.5 5 7.5 10 12.5 15
$V_{dc}$ 814
Voltage (v)
400
200
0
0 2.5 5 7.5 10 12.5 15
$V_1$
$V_4$
$V_7$ 816
Voltage (v)
200
100
0
0 2.5 5 7.5 10 12.5 15
$V_2$
$V_5$
$V_8$ 818
Voltage (v)
100
50
0
0 2.5 5 7.5 10 12.5 15
$V_3$
$V_6$
$V_9$
Time (s)

824
$V_{Line}$
400
0
-400
1.2 1.4 1.6 1.8 2 2.2 2.4 2.6 2.8 3

826
$V_{Phase}$
200
0
-200
1.2 1.4 1.6 1.8 2 2.2 2.4 2.6 2.8 3

828
$I_a$
5
0
-5
1.2 1.4 1.6 1.8 2 2.2 2.4 2.6 2.8 3
Time (s)

FIG. 8B 912
914
916
918
902
904
Voltage (v)
Vdc
V1
V4
V7
V2
V5
V8
V3
V6
V9
Time (s)

922
924
926
928
V9L
VLine
VPhase
Ia
Time (s)

1012
1014
1016
Voltage (v)
$V_{dc}$
$V_1$
$V_4$
$V_7$
$V_2$
$V_5$
$V_8$
$V_3$
$V_6$
$V_9$
Time (s)

1022
1024
1026
1028
$V_{9L}$
$V_{Line}$
$V_{Phase}$
$I_a$
1002
Time (s)

1032
Voltage (v)
800
400
0
0
2.5
5
7.5
10
12.5
15
$V_{dc}$
1034
400
200
$V_1$
$V_4$
$V_7$
1036
200
100
$V_2$
$V_5$
$V_8$
100
50
$V_3$
$V_6$
$V_9$
Time (s)

1042
$V_{9L}$
4.9
5
5.1
1044
$V_{Line}$
-400
1046
$V_{Phase}$
-200
1048
$I_a$
10
-10
1004
Time (s)

1132
Voltage (v)
800
400
0
0
2.5
5
7.5
10
12.5
15
$V_{dc}$
1134
400
200
$V_1$
$V_4$
$V_7$
1136
100
$V_2$
$V_5$
$V_8$
1138
50
$V_3$
$V_6$
$V_9$
Time (s)

1142
$V_{9L}$
5.05
5.075
5.1
1144
$V_{Line}$
-400
1146
$V_{Phase}$
-200
1148
$I_a$
5
-5
Time (s)

MULTILEVEL ELECTRIC POWER CONVERTER

CROSS-REFERENCE TO RELATED APPLICATIONS

The present application is a United States National Stage of International Application No. PCT/CA2022/051075, filed on Jul. 11, 2022, which claims the benefit of U.S. Provisional Patent Application No. 63/220,697 filed on Jul. 12, 2021, the contents of which are hereby incorporated by reference in their entirety.

TECHNICAL FIELD

The present disclosure relates generally to the field of power converters, and more particularly to multilevel power converters.

BACKGROUND

Voltage source inverters (VSIs) have become a dominant power electronics converter in various industrial applications. VSIs are used in a number of applications, including multilevel converters, which can offer improved power quality and voltage stress reduction. In particular, modular multilevel converters (MMCs) have been used in industry due to ease of repair and maintenance, since damaged modules can easily be fixed or replaced.

A traditional MMC design is composed of multiple submodules, which typically rely on two-level converters of various types. However, many existing MMC designs are limited in their applicability, require components having high tolerances, or produce outputs which are of limited fidelity. In some cases, achieving higher quality output waveforms requires the number of submodules in the design to be increased. This in turn can result in higher power losses, lower reliability, higher complexity in voltage balancing, increased sensors and component complexity.

As a result, improvements remain desirable.

SUMMARY

In accordance with one aspect, there is provided a power converter for transforming electrical power between direct current (DC) power and alternating current (AC) power, comprising a first stage comprising a first branch having a first pair of series-connected switches, a second branch having a second pair of series-connected switches, and a capacitor connected between the first and second branches, a second stage comprising a third branch having a first plurality of series-connected switches, a fourth branch having a second plurality of series-connected switches, and a plurality of capacitors connected between the third and fourth branches at respective connection points located between intermediate switches of the first and second pluralities of series-connected switches, and a connection branch coupling the first stage and the second stage.

In some embodiments, the first plurality of series-connected switches comprises a first group of three switches, wherein the second plurality of series-connected switches comprises a second group of three switches, and the plurality of capacitors comprises first and second capacitors. The first capacitor is connected between a first switch and a second switch of the first group of three switches and between a first switch and a second switch of the second group of three switches, and the second capacitor is connected between the second switch and a third switch of the first group of three switches and between the second switch and a third switch of the second group of three switches.

In some embodiments, the first plurality of series-connected switches comprises a first group of N switches, the second plurality of series-connected switches comprises a second group of N switches, and the plurality of capacitors comprises N-1 capacitors.

In some embodiments, each of the first pair and the second pair of series-connected switches comprises a first switch and a second switch, and a DC source is connectable to a first node connected to the second switch of the first pair of series-connected switches and to a second node connected to the second switch of the second pair of series-connected switches, the second node being a neutral point of the power converter.

In some embodiments, an AC load is connectable to the second node and to a common node connecting the first switch of the first group of three switches and the first switch of the second group of three switches.

In some embodiments, the connection branch is connected between a first common node and a second common node, the first common node connecting the first switch of the first pair of series-connected switches and the first switch of the second pair of series-connected switches, and the second common node connecting the third switch of the first group of three switches and the third switch of the second group of three switches.

In some embodiments, each of the first pair and the second pair of series-connected switches comprises a first switch and a second switch, and a DC load is connectable to a first node connected to the second switch of the first pair of series-connected switches and to a second node connected to the second switch of the second pair of series-connected switches, the second node being a neutral point of the power converter.

In some embodiments, an AC source is connectable to the second node and to a common node connecting the first switch of the first group of three switches and the first switch of the second group of three switches.

In some embodiments, the first pair of series-connected switches is configured to operate complementarily with the second pair of series-connected switches, and the first plurality of series-connected switches is configured to operate complementarily with the second plurality of series-connected switches for defining a plurality of distinct switching states producing different voltage levels at an output of the power converter.

In some embodiments, the first and the second pair of series-connected, and the first and the second plurality of series-connected switches are configured to operate for defining twenty-six switching states producing nine voltage levels at the output of the power converter.

In accordance with another aspect, there is provided a three-phase power converter for transforming electrical power between direct current (DC) power and alternating current (AC) power, comprising first, second, and third power converters, the first, second, and third power converters are connected to a first common node connectable to a DC system, to a second common node as a neutral point of the three-phase converter, and to a third common node connectable to an AC system.

In some embodiments, for each of the first, second, and third power converters, the first plurality of series-connected switches comprises a first group of at least three switches, the second plurality of series-connected switches comprises a second group of at least three switches, and each capacitor of the plurality of capacitors is connected between a pair of adjacent switches of the first group of switches and a corresponding pair of adjacent switches of the second group of switches.

In some embodiments, the first common node is connectable to the DC system comprising a DC source.

In some embodiments, the third common node is connectable to the AC system comprising three AC load elements, each AC load element associated with a respective phase and connected to a respective one of the first, second, and third power converters.

In some embodiments, for each of the first, second, and third power converters, the first plurality of series-connected switches comprises a first group of three switches and the second plurality of series-connected switches comprises a second group three switches.

In some embodiments, for each of the first, second, and third power converters, the first plurality of series-connected switches comprises a first group of more than three switches and the second plurality of series-connected switches comprises a second group of more than three switches.

In some embodiments, for each of the first, second, and third power converters, the second stage comprises a half-bridge inverter connected to a switching cell, the half-bridge inverter comprising a first switch of the first group of switches, a first switch of the second group of switches, and a first capacitor of the plurality of capacitors connected therebetween, and the switching cell comprising a second and a third switch of the first group of switches, a second and a third switch of the second group of switches, and an intermediate branch therebetween, the intermediate branch comprising remaining ones of the plurality of capacitors and a pair of bidirectional switches.

In some embodiments, the switching cell is connected to the half-bridge inverter with the third branch and the fourth branch each connecting to the half-bridge inverter on opposing terminals of the first capacitor.

In some embodiments, the intermediate branch comprises a capacitor branch formed by a second capacitor and a third capacitor of the plurality of capacitors, the capacitor branch connected between the third branch and the fourth branch at points located between the second and the third switch of the first group of switches and between the second and the third switch of the second group of switches.

In some embodiments, the bidirectional switches of the intermediate branch are connected between the capacitor branch and the third and fourth branch to divide the second capacitor and the third capacitor of the capacitor branch.

Many further features and combinations thereof concerning embodiments described herein will appear to those skilled in the art following a reading of the instant disclosure.

BRIEF DESCRIPTION OF THE DRAWINGS

In the figures:

FIG. 3 illustrates an example three-phase power converter topology.

FIGS. 8A-8C illustrate example simulation results for the three-phase power converter topology of FIG. 3 during startup conditions.

It will be noted that throughout the appended drawings, like features are identified by like reference numerals.

DETAILED DESCRIPTION

The present disclosure relates to power converters, having applications which include converting alternating current (AC) electrical power to direct current (DC) electrical power, and vice-versa. In at least some embodiments, there is provided a power converter composed of connected U-cells in two stages powered by a single DC power supply: the first stage includes a U-cell supplied by the single DC source and the second stage is a hybrid packed U-cell (PUC) that defines an AC output terminal. In at least some embodiments, there is provided a single DC-source, three-phase, nine-level power converter topology using active capacitor voltage balancing. The three-phase nine-level power converter topology is referred to herein as a UPUC topology. The UPUC topology comprises a number of auxiliary capacitors, which are actively balanced using redundant switching states irrespective of current direction. In some embodiments, the aforementioned second stage may be expandable by increasing the number of components in the second stage, which may increase the number of stepped voltage levels that the UPUC topology can generate.

Figure 1:
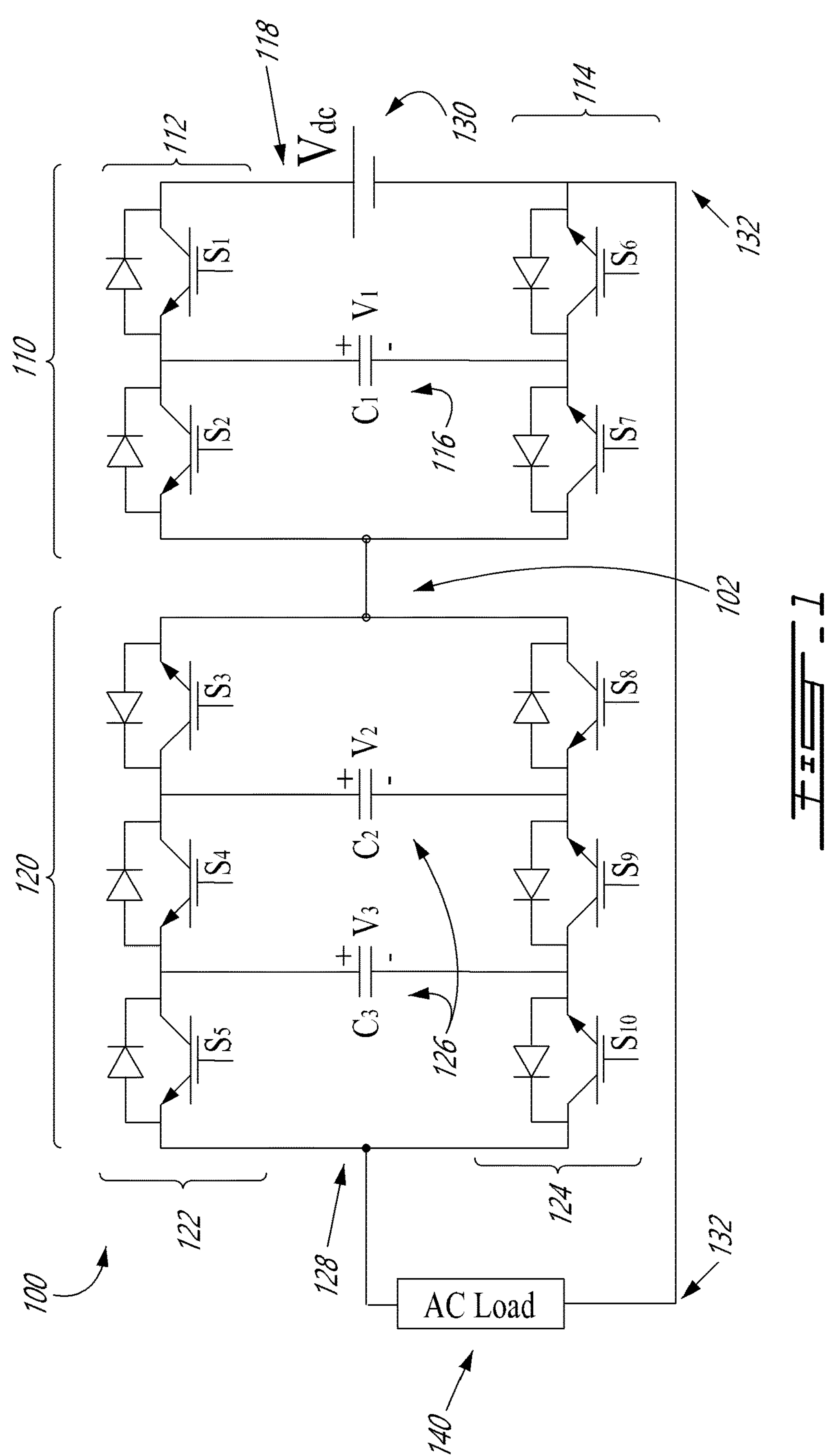
FIG. 1 illustrates an example power converter topology.

With reference to FIG. 1, a power converter implementing the UPUC topology is illustrated (referred to hereinafter as UPUC converter 100). The UPUC converter 100 comprises two stages connected by a connection branch 102. The first stage is composed of a U-cell 110, which includes a first branch 112, containing two series-connected switches $S_1$, $S_2$, a second branch 114 containing two series-connected switches $S_6$, $S_7$, and a capacitor 116 connected between the two branches 112, 114. The U-cell 110 also defines a node 118 at which a DC source 130 may be coupled; the DC source 130 may also be coupled to a node 132 (i.e. a neutral point for the UPUC converter 100). The second stage is composed of a hybrid PUC 120, which includes a first branch 122, containing a number of series-connected switches $S_3$, $S_4$, $S_5$, a second branch 124 containing a number of series-connected switches $S_8$, $S_9$, $S_{10}$, and a number of capacitors 126 connected between the two branches 122, 124. In the example of FIG. 1, the branches 122, 124 of the hybrid PUC 120 include three switches each, and the hybrid PUC 120 includes two capacitors 126; however, as will be described in greater detail herein below, the hybrid PUC 120 may be expanded to include additional switches and capacitors. The hybrid PUC 120 also defines a node 128 at which an AC load 140 may be coupled, which itself may be coupled to the node 132. It should be noted that although the UPUC converter 100 illustrated in FIG. 1 is coupled to a DC source 130 and to an AC load 140, and thus being used to convert DC power into AC power, the UPUC converter 100 can also be used to convert AC power into DC power, for instance by applying an AC source to the node 128 and a DC load to the node 118.

In the U-cell 110, the switches $S_1$ and $S_2$ of the branch 112 operate complementarily with the switches $S_6$ and $S_7$ of the branch 114; that is to say, when one switch of the branch 112 is active, the corresponding switch of the branch 114 is not active. For example, the switch $S_1$ of the branch 112 is active when the switch Se of the branch 114 is not active, and vice-versa. Similarly, in the hybrid PUC 120, the switches $S_3$, $S_4$, $S_5$ of the branch 122 operate complementarily with the switches $S_8$, $S_9$, $S_{10}$ of the branch 124. The complementary switching behaviour of the switches $S_1$-$S_{10}$ of the UPUC converter 100 defines thirty-two (32) distinct switching states. However, some of the switching states may define redundant or undesirable voltage levels; as a result, in some embodiments, the UPUC converter 100 is operated to produce twenty-six (26) switching states, with the switching states defining different voltage levels produced at the node 128 for the AC load 140.

Figures 2A, 2B, 2C, 2D, 2E, 2F, 2G, 2H:
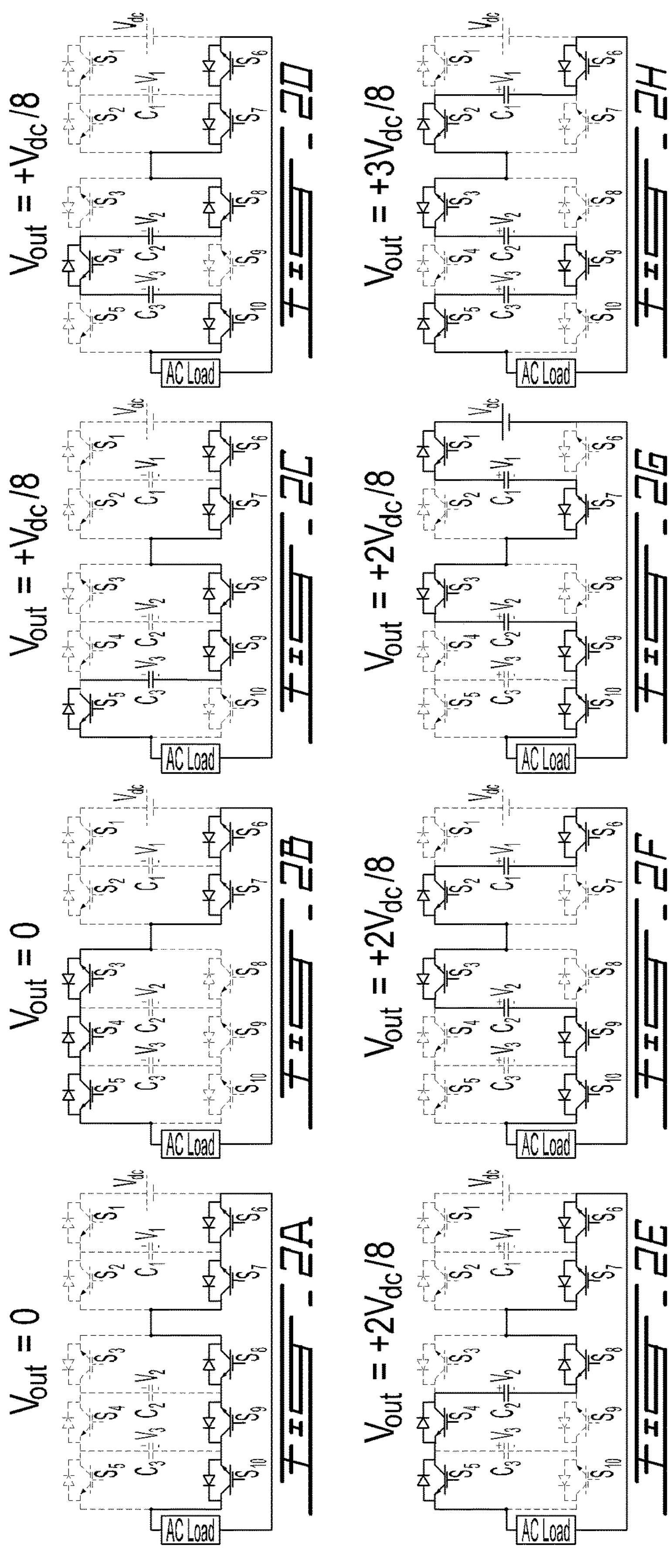
FIGS. 2A-2Z illustrate example charging states of the power converter topology of FIG. 1.
Figures 2I, 2J, 2K, 2L, 2M, 2N, 2O, 2P:
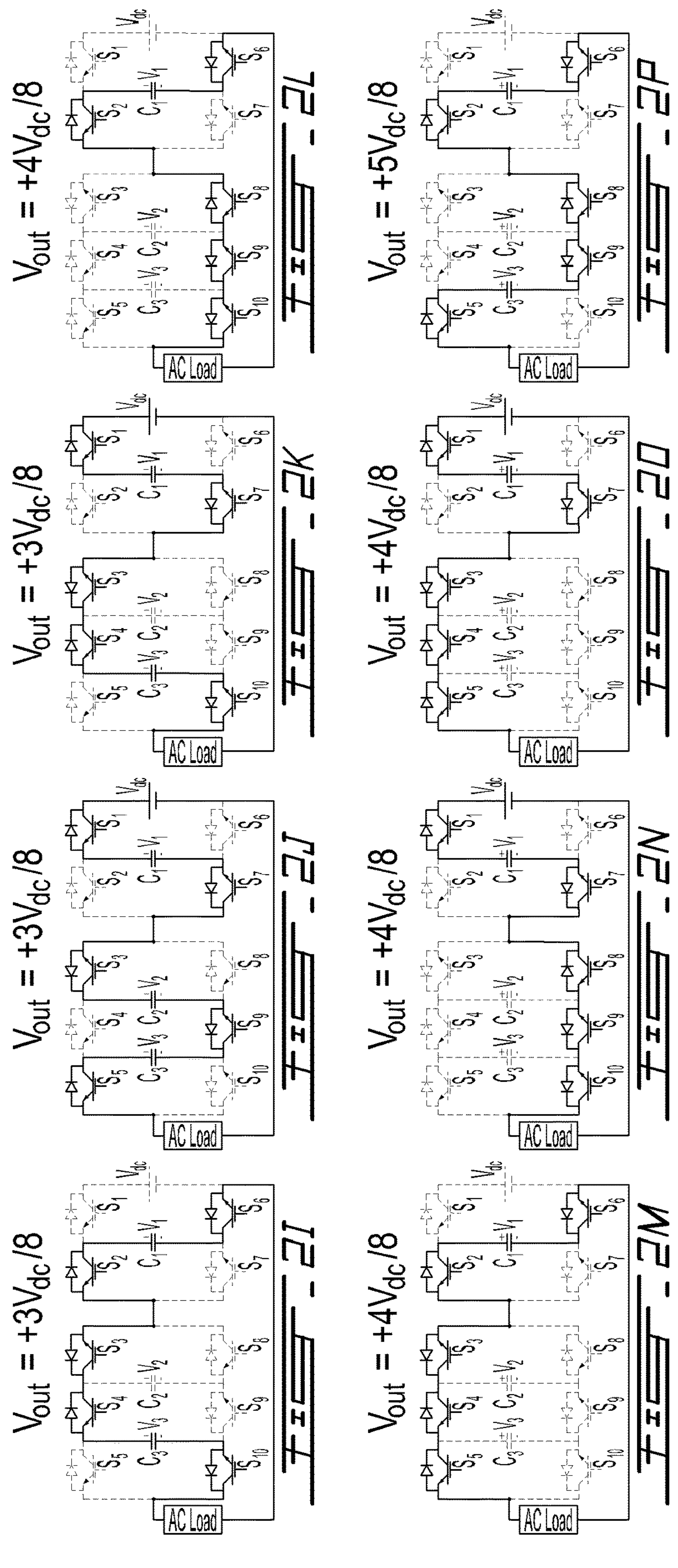
Figures 2Q, 2R, 2S, 2T, 2U, 2V, 2W, 2X, 2Y, 2Z:
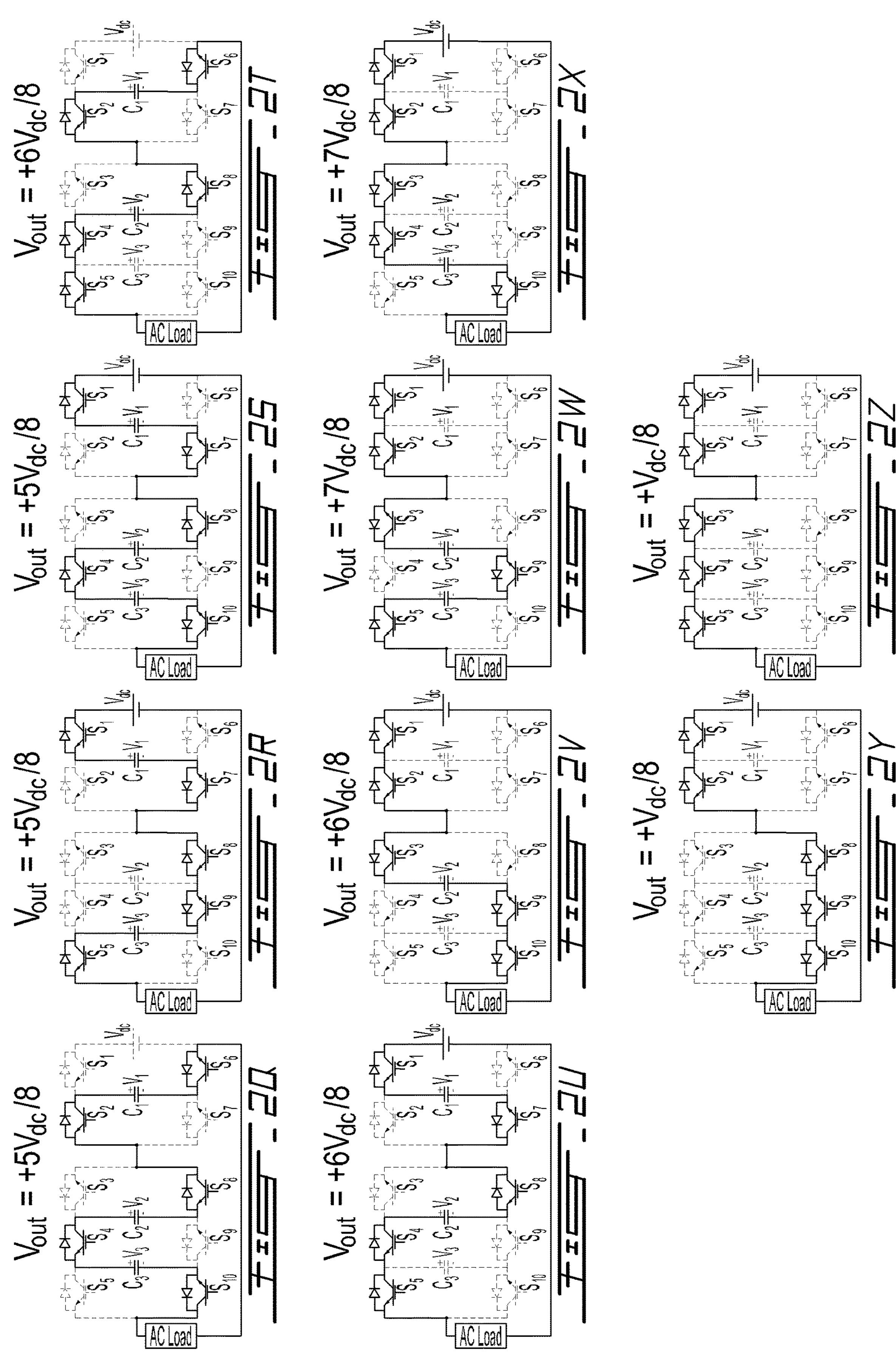

With additional reference to FIGS. 2A-2Z and Table 1, the twenty-six (26) switching states for the UPUC converter 100 are illustrated. The switching states define a conduction path for AC power provided to the AC load 140 at the node 128 based on the DC power provided by the DC source 130 at the node 118. In Table 1, values for control signals used to control the operation of switches $S_1$-$S_5$ (of the branches 112, 122) are presented; since switches $S_6$-$S_{10}$ (of the branches 114, 124) are operated complementarily with switches $S_1$-$S_5$, the control signals used to control the operation of the switches $S_6$-$S_{10}$ are the logical inverse of those used for switches $S_1$-$S_5$. The switching states are used to produce seventeen (17) different voltage levels at the node 128, ranging between $-V_{dc}$ to $+V_{dc}$. For instance, the voltage values produced at the node 128 may include: $-V_{dc}$, $-7V_{dc}/8$, $-3V_{dc}/4$, $-5V_{dc}/8$, $-1V_{dc}/2$, $-3V_{dc}/8$, $-1V_{dc}/4$, $-1V_{dc}/8$, 0, $+1V_{dc}/8$, $+1V_{dc}/4$, $+3V_{dc}/8$, $+1V_{dc}/2$, $+5V_{dc}/8$, $+3V_{dc}/4$, $+7V_{dc}/8$, $+V_{dc}$.

TABLE 1

Switching States for FIGS. 2A-2Z

| Switching State | $S_1$ | $S_2$ | $S_3$ | $S_4$ | $S_5$ | Output Voltage (at the node 128) |
|---|---|---|---|---|---|---|
| 1 (FIG. 2A) | 0 | 0 | 0 | 0 | 0 | $V_{out} = 0$ |
| 2 (FIG. 2B) | 0 | 0 | 1 | 1 | 1 | $V_{out} = 0$ |
| 3 (FIG. 2C) | 0 | 0 | 0 | 0 | 1 | $V_{out} = +V_{dc}/8$ |
| 4 (FIG. 2D) | 0 | 0 | 0 | 1 | 0 | $V_{out} = +V_{dc}/8$ |
| 5 (FIG. 2E) | 0 | 0 | 0 | 1 | 1 | $V_{out} = +2\ V_{dc}/8$ |
| 6 (FIG. 2F) | 0 | 1 | 1 | 0 | 0 | $V_{out} = +2\ V_{dc}/8$ |
| 7 (FIG. 2G) | 1 | 0 | 1 | 0 | 0 | $V_{out} = +2\ V_{dc}/8$ |
| 8 (FIG. 2H) | 0 | 1 | 1 | 0 | 1 | $V_{out} = +3\ V_{dc}/8$ |
| 9 (FIG. 2I) | 0 | 1 | 1 | 1 | 0 | $V_{out} = +3\ V_{dc}/8$ |
| 10 (FIG. 2J) | 1 | 0 | 1 | 0 | 1 | $V_{out} = +3\ V_{dc}/8$ |
| 11 (FIG. 2K) | 1 | 0 | 1 | 1 | 0 | $V_{out} = +3\ V_{dc}/8$ |
| 12 (FIG. 2L) | 0 | 1 | 0 | 0 | 0 | $V_{out} = +4\ V_{dc}/8$ |
| 13 (FIG. 2M) | 0 | 1 | 1 | 1 | 1 | $V_{out} = +4\ V_{dc}/8$ |
| 14 (FIG. 2N) | 1 | 0 | 0 | 0 | 0 | $V_{out} = +4\ V_{dc}/8$ |
| 15 (FIG. 2O) | 1 | 0 | 1 | 1 | 1 | $V_{out} = +4\ V_{dc}/8$ |
| 16 (FIG. 2P) | 0 | 1 | 0 | 0 | 1 | $V_{out} = +5\ V_{dc}/8$ |
| 17 (FIG. 2Q) | 0 | 1 | 0 | 1 | 0 | $V_{out} = +5\ V_{dc}/8$ |
| 18 (FIG. 2R) | 1 | 0 | 0 | 0 | 1 | $V_{out} = +5\ V_{dc}/8$ |
| 19 (FIG. 2S) | 1 | 0 | 0 | 1 | 0 | $V_{out} = +5\ V_{dc}/8$ |
| 20 (FIG. 2T) | 0 | 1 | 0 | 1 | 1 | $V_{out} = +6\ V_{dc}/8$ |
| 21 (FIG. 2U) | 1 | 0 | 0 | 1 | 1 | $V_{out} = +6\ V_{dc}/8$ |
| 22 (FIG. 2V) | 1 | 1 | 1 | 0 | 0 | $V_{out} = +6\ V_{dc}/8$ |
| 23 (FIG. 2W) | 1 | 1 | 1 | 0 | 1 | $V_{out} = +7\ V_{dc}/8$ |
| 24 (FIG. 2X) | 1 | 1 | 1 | 1 | 0 | $V_{out} = +7\ V_{dc}/8$ |
| 25 (FIG. 2Y) | 1 | 1 | 0 | 0 | 0 | $V_{out} = +8\ V_{dc}/8$ |
| 26 (FIG. 2Z) | 1 | 1 | 1 | 1 | 1 | $V_{out} = +8\ V_{dc}/8$ |

Depending on the switching state of the UPUC converter 100, the capacitors 116, 126 may be charging, discharging, or maintaining an existing state of charge. The UPUC converter 100 may be controlled to maintain a particular level of voltage balancing for the capacitors 116, 126. In Table 2, the charging/discharging state of the capacitors 116, 126 is presented, with the capacitor 116 labeled $C_1$, and the capacitors 126 labelled as $C_2$ and $C_3$.

TABLE 2

Capacitor States for FIGS. 2A-2Z

| Switching State | $S_1$ | $S_2$ | $S_3$ | $S_4$ | $S_5$ | $C_1$ State | $C_2$ State | $C_3$ State |
|---|---|---|---|---|---|---|---|---|
| 1 (FIG. 2A) | 0 | 0 | 0 | 0 | 0 | Neutral | Neutral | Neutral |
| 2 (FIG. 2B) | 0 | 0 | 1 | 1 | 1 | Neutral | Neutral | Neutral |
| 3 (FIG. 2C) | 0 | 0 | 0 | 0 | 1 | Neutral | Neutral | Discharging |
| 4 (FIG. 2D) | 0 | 0 | 0 | 1 | 0 | Neutral | Discharging | Charging |
| 5 (FIG. 2E) | 0 | 0 | 0 | 1 | 1 | Neutral | Discharging | Neutral |
| 6 (FIG. 2F) | 0 | 1 | 1 | 0 | 0 | Discharging | Charging | Neutral |
| 7 (FIG. 2G) | 1 | 0 | 1 | 0 | 0 | Charging | Charging | Neutral |
| 8 (FIG. 2H) | 0 | 1 | 1 | 0 | 1 | Discharging | Charging | Discharging |
| 9 (FIG. 2I) | 0 | 1 | 1 | 1 | 0 | Discharging | Neutral | Charging |
| 10 (FIG. 2J) | 1 | 0 | 1 | 0 | 1 | Charging | Charging | Discharging |
| 11 (FIG. 2K) | 1 | 0 | 1 | 1 | 0 | Charging | Neutral | Charging |
| 12 (FIG. 2L) | 0 | 1 | 0 | 0 | 0 | Discharging | Neutral | Neutral |
| 13 (FIG. 2M) | 0 | 1 | 1 | 1 | 1 | Discharging | Neutral | Neutral |
| 14 (FIG. 2N) | 1 | 0 | 0 | 0 | 0 | Charging | Neutral | Neutral |
| 15 (FIG. 2O) | 1 | 0 | 1 | 1 | 1 | Charging | Neutral | Neutral |
| 16 (FIG. 2P) | 0 | 1 | 0 | 0 | 1 | Discharging | Neutral | Discharging |
| 17 (FIG. 2Q) | 0 | 1 | 0 | 1 | 0 | Discharging | Discharging | Charging |
| 18 (FIG. 2R) | 1 | 0 | 0 | 0 | 1 | Charging | Neutral | Discharging |
| 19 (FIG. 2S) | 1 | 0 | 0 | 1 | 0 | Charging | Discharging | Charging |
| 20 (FIG. 2T) | 0 | 1 | 0 | 1 | 1 | Discharging | Discharging | Neutral |
| 21 (FIG. 2U) | 1 | 0 | 0 | 1 | 1 | Charging | Discharging | Neutral |
| 22 (FIG. 2V) | 1 | 1 | 1 | 0 | 0 | Neutral | Charging | Neutral |

TABLE 2-continued

Capacitor States for FIGS. 2A-2Z

| Switching State | $S_1$ | $S_2$ | $S_3$ | $S_4$ | $S_5$ | $C_1$ State | $C_2$ State | $C_3$ State |
|---|---|---|---|---|---|---|---|---|
| 23 (FIG. 2W) | 1 | 1 | 1 | 0 | 1 | Neutral | Charging | Discharging |
| 24 (FIG. 2X) | 1 | 1 | 1 | 1 | 0 | Neutral | Neutral | Charging |
| 25 (FIG. 2Y) | 1 | 1 | 0 | 0 | 0 | Neutral | Neutral | Neutral |
| 26 (FIG. 2Z) | 1 | 1 | 1 | 1 | 1 | Neutral | Neutral | Neutral |

Given the switching states of the UPUC converter 100, redundant states may be used for charging and/or for discharging the capacitors 116, 126, thereby allowing for regulation of capacitor voltages. For example, the capacitors 116, 126 are not used to produce the $\pm V_{dc}$ and 0 voltage levels, and are used for producing the voltage levels $\pm 1V_{dc}/4$, $\pm 3V_{dc}/8$, $\pm 1V_{dc}/2$, $\pm 5V_{dc}/8$, $\pm 3V_{dc}/4$, $\pm 7V_{dc}/8$. The choice of switching states, and the control signals used to produce the switching states, may be selected to provide voltage balancing for the capacitors 116, 126.

In Table 3, the six unused switching states for the UPUC converter 100—i.e., the six states which are not presented in FIGS. 2A-2Z and are not used as part of producing the nine voltage levels—are presented.

TABLE 3

Unused Switching States for UPUC Converter 100

| Switching State | $S_1$ | $S_2$ | $S_3$ | $S_4$ | $S_5$ | Output Voltage (at the node 128) | C1 | $C_2$ | $C_3$ |
|---|---|---|---|---|---|---|---|---|---|
| 1 | 0 | 0 | 1 | 0 | 0 | $V_{out} = -V_{dc}/8$ | Neutral | Discharging | Neutral |
| 2 | 0 | 0 | 1 | 0 | 1 | $V_{out} = -V_{dc}/8$ | Neutral | Discharging | Discharging |
| 3 | 0 | 0 | 1 | 1 | 0 | $V_{out} = -V_{dc}/8$ | Neutral | Neutral | Discharging |
| 4 | 1 | 1 | 0 | 0 | 1 | $V_{out} = -9\ V_{dc}/8$ | Neutral | Neutral | Charging |
| 5 | 1 | 1 | 0 | 1 | 0 | $V_{out} = -9\ V_{dc}/8$ | Neutral | Charging | Charging |
| 6 | 1 | 1 | 0 | 1 | 1 | $V_{out} = -10\ V_{dc}/8$ | Neutral | Charging | Neutral |

With reference to FIG. 3, a three-phase UPUC converter 300 is illustrated. In the example of FIG. 3, the three-phase UPUC converter 300 is illustrated as being used to convert DC power from a DC source 340 into AC power for an AC load 350. It should be noted, however, that the three-phase UPUC converter 300 can also be used to convert AC power into DC power, and thus that the three-phase UPUC converter 300 can be connectable to any suitable DC system and to any suitable AC system in order to appropriately convert between DC power and AC power.

The three-phase UPUC converter 300 is composed of three copies of the UPUC converter 100, denoted as UPUC converters 310, 320, 330. The UPUC converters 310, 320, 330 are connected to the DC source 340 via a common node 302, which connects the branches 112 of the U-cells 110 of the UPUC converters 310, 320, 330 to the DC source 340. It should be noted that the DC source 340 is connected to the three UPUC converters 310, 320, 330; it is not required for the UPUC converters 310, 320, 330 to be provided with individual DC sources. The UPUC converters 310, 320, 330 are also connected to a neutral point 305 of the three-phase converter via a common node 304, which connects the branches 114 of the U-cells 110 of the UPUC converters 310, 320, 330 to the neutral point 305 of the three-phase converter.

The AC load 350 is composed of three load elements 352, 354, 356, each associated with a respective phase, and are each connected to a respective one of the UPUC converters 310, 320, 330. The load element 352 is connected to the UPUC converter 310 at the node 128 of the UPUC converter 310; similarly, the load elements 354 and 356 are connected at the nodes 128 of the UPUC converters 320, 330. The load elements 352, 354, 356 may also be coupled together at a node 358, which may be connected to a ground, for instance.

In operation, the three-phase UPUC converter 300 may be coupled to the DC source 340 and to the three-phase load 350 (though the three-phase UPUC converter may be coupled to any suitable DC and AC systems, as appropriate). Control signals are provided to the switches of the UPUC converters 310, 320, 330, for instance by a controller, which causes the UPUC converters 310, 320, 330 to assume different ones of the switching states presented in FIGS. 2A-2Z. For example, the UPUC converters 310, 320, 330 are controlled to produce three-phase AC power at respective nodes 128 thereof (labeled A, B, C respectively), which is thus provided to the load elements 352, 354, 356 of the AC load 350.

Figure 4:
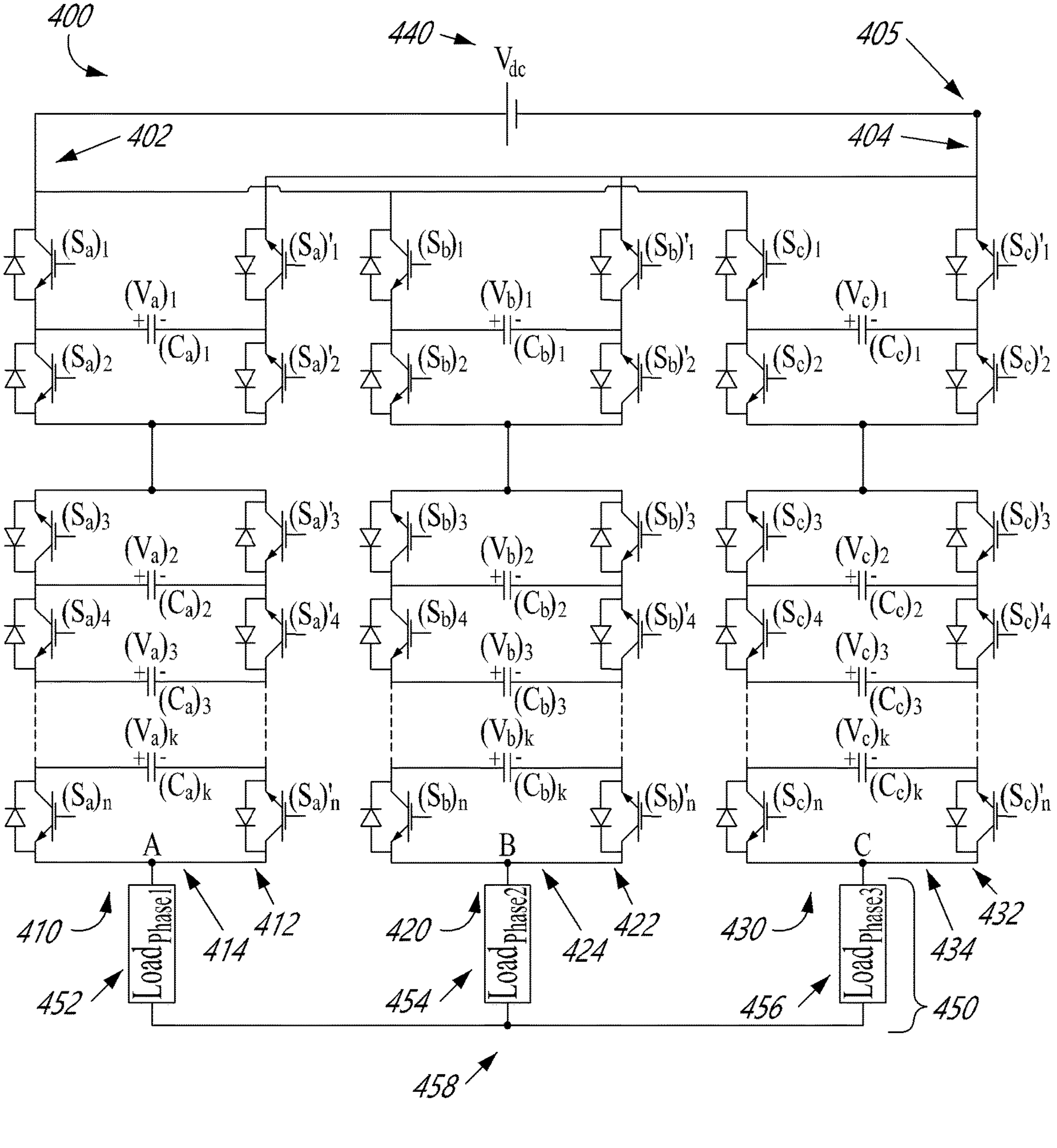
FIG. 4 illustrates an example expandable three-phase power converter topology.

With reference to FIG. 4, an expandable three-phase UPUC converter 400 is illustrated. In the example of FIG. 4, the expandable three-phase UPUC converter 400 is illustrated as being used to convert DC power from a DC source 440 into AC power for an AC load 450. It should be noted, however, that the expandable three-phase UPUC converter 400 can also be used to convert AC power into DC power.

The expandable three-phase UPUC converter 400 is composed of three expandable UPUC converters 410, 420, 430, which are modified from the UPUC converter 100. The expandable UPUC converters 410, 420, 430 are also composed of two stages: the U-cell 110 of the UPUC converter 100, and an expandable version of the hybrid PUC 120. The expandable hybrid PUCs, denoted at 412, 422, 432, are composed of two branches of series-connected switches and capacitors connected between the two branches. By virtue of being expandable, the expandable hybrid PUCs 412, 422, 432 may include more than three switches per branch, and more than two capacitors. For instance, an embodiment of the expandable hybrid PUCs 412, 422, 432 may include four switches per branch and three capacitors. The generalized relationship between the number of switches per branch to the number of capacitors is defined as C=S−1, where C is the number of capacitors per expandable hybrid PUC, and S is the number of switches per branch per expandable hybrid PUC. The expandable three-phase UPUC converter 400 may be controlled in similar fashion as the three-phase UPUC converter 300, with additional control signals being provided to the additional switches of the expandable hybrid PUCs 412, 422, 432. The expandable three-phase UPUC converter 400 may be controlled to produce additional discrete voltage levels than the seventeen (17) voltage levels which are produced by the three-phase UPUC converter 300.

The expandable UPUC converters 410, 420, 430 are connected to the DC source 440 via a common node 402, which connects the branches 112 of the U-cells 110 of the UPUC converters 410, 420, 430 to the DC source 440. It should be noted that the DC source 440 is connected to the three UPUC converters 410, 420, 430; it is not required for the UPUC converters 410, 420, 430 to be provided with individual DC sources. The UPUC converters 410, 420, 430 are also connected to a neutral point 405 of the three-phase converter via a common node 404, which connects the branches 114 of the U-cells 110 of the UPUC converters 410, 420, 430 to the neutral point 405 of the three-phase converter.

The AC load 450 is composed of three load elements 452, 454, 456, each associated with a respective phase, and are each connected to a respective one of the UPUC converters 410, 420, 430. The load element 452 is connected to the UPUC converter 410 at a node 414 of the UPUC converter 410; similarly, the load elements 454 and 456 are connected at the nodes 424 and 434, respectively, of the UPUC converters 420, 430. The load elements 452, 454, 456 may also be coupled together at a node 458, which may be connected to a ground, for instance.

Figure 5A:
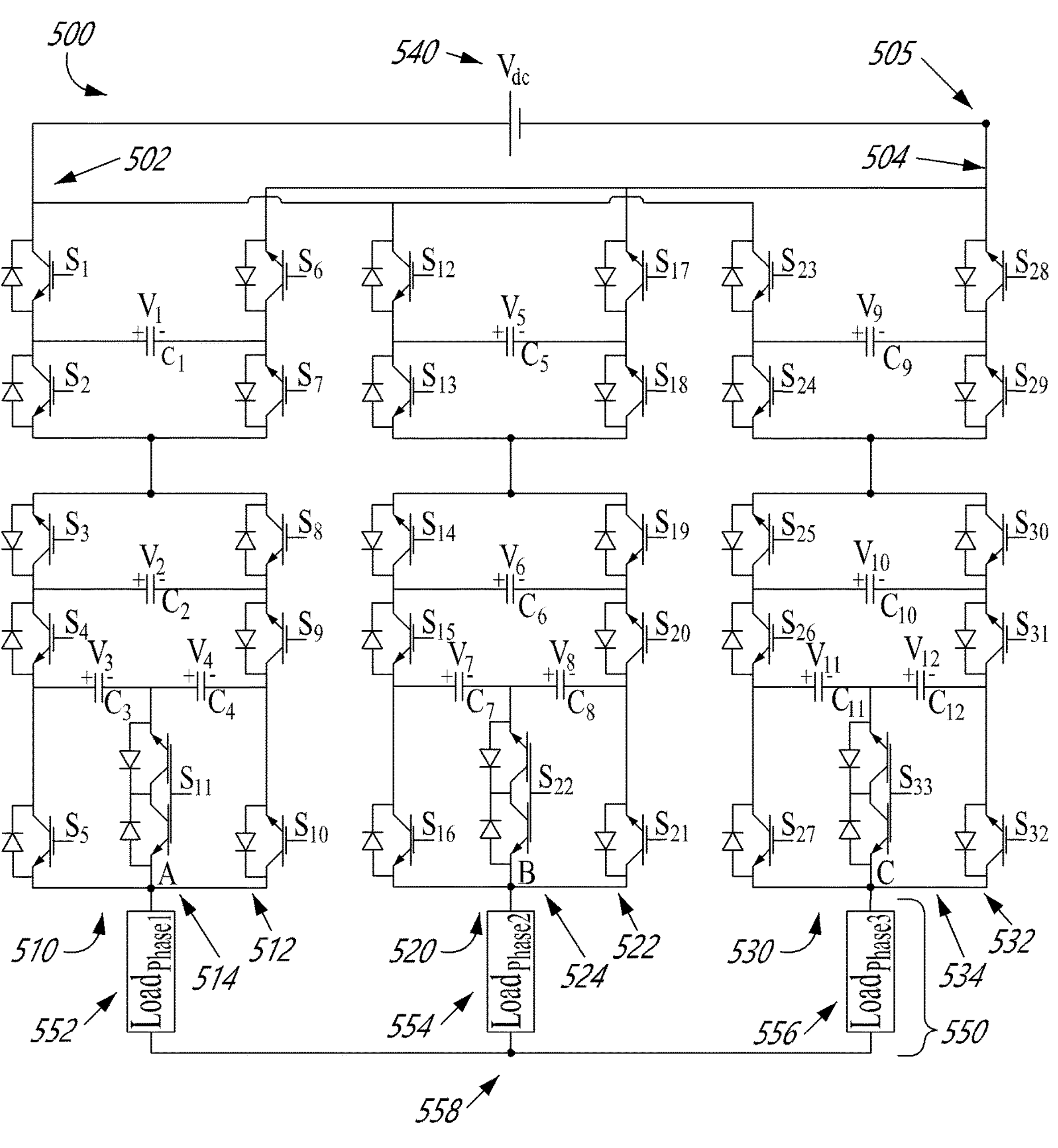
FIG. 5A illustrates an example three-phrase power converter topology.

With reference to FIG. 5A, an alternative three-phase converter, termed a three-phase UPEC converter 500, is illustrated. In the example of FIG. 5, the three-phase UPEC converter 500 is illustrated as being used to convert DC power from a DC source 540 into AC power for an AC load 550. It should be noted, however, that the three-phase UPEC converter 500 can also be used to convert AC power into DC power. The three-phase UPEC converter 500 is composed of three UPEC converters 510, 520, 530, which are modified from the UPUC converter 100. The expandable UPEC converters 510, 520, 530 are also composed of two stages: the U-cell 110 of the UPUC converter 100, and an alternative to the hybrid PUC 120, referred to as a hybrid packed E-cell (PEC). The three-phase UPEC converter 500 may be controlled to produce additional discrete voltage levels than the nine (9) voltage levels which are produced by the three-phase UPUC converter 300.

Figure 5B:
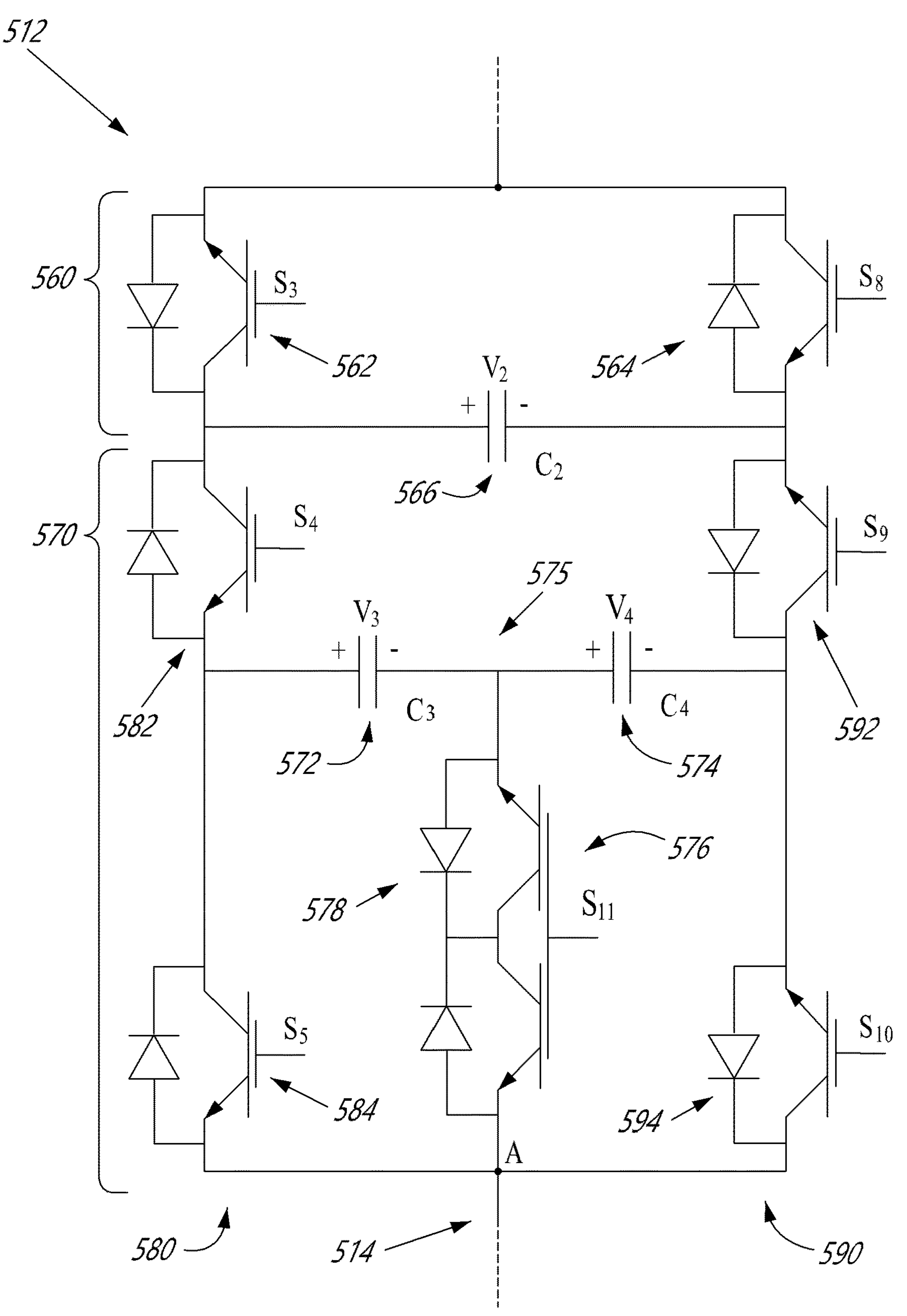
FIG. 5B illustrates an example hybrid packed E-cell converter topology.

With additional reference to FIG. 5B, a close-up view of the hybrid PEC 512 is presented. Although the foregoing disclosure relates to the hybrid PEC 512, it should be understood that the hybrid PECs 522, 532, are substantially identical to the hybrid PEC 512. The hybrid PEC 512 is composed of a half-bridge inverter 560 and a switching cell 570. The half-bridge inverter 560 is composed of two switches 562, 564, and a capacitor 566 connected there between. The switching cell 570 includes two branches 580, 590, capacitors 572, 574, and an intermediate branch 576. The switching cell 570 is connected to the half-bridge inverter 560 such that the two branches 580, 590 each connect to the half-bridge inverter 560 on opposing terminals of the capacitor 566.

The branch 580 is formed of switches 582, 584, and the branch 590 is formed of switches 592, 594. The capacitors 572, 574 form a capacitor branch 575 which is connected between the first and second branches 580, 590, connecting thereto at points located between the switches 582 and 584 and between the switches 592 and 594. The intermediate branch 576 is composed of bidirectional switches 578, which can be connected in a common-source configuration, in a common-drain configuration, or in any other suitable fashion. For example, the bidirectional switches 578 can be connected so that the source of a first one of the bidirectional switches 578 is connected to the source of a second one of the bidirectional switches 578. The intermediate branch 576 that is composed of the bidirectional switches 578 is connected between the capacitor branch 575 and the branches 580, 590 to divide the capacitors 572, 574 of the capacitor branch 575. As a result, the capacitors 572, 574 are split and can allow the hybrid PEC 512 to provide a broader range of DC voltages, leading to more voltage levels at the node 514.

With continued reference to FIG. 5A, the UPEC converters 510, 520, 530 are connected to the DC source 540 via a common node 502, and to the neutral node 505 of the three-phase converter via a common node 504. It should be noted that the DC source 540 is connected to the three UPEC converters 510, 520, 530; it is not required for the UPEC converters 510, 520, 530 to be provided with individual DC sources. The AC load 550 is composed of three load elements 552, 554, 556, each associated with a respective phase, and are each connected to a respective one of the UPEC converters 510, 520, 530. The load element 552 is connected to the UPEC converter 510 at a node 514 of the UPEC converter 510; similarly, the load elements 554 and 556 are connected at the nodes 524 and 534, respectively, of the UPUC converters 520, 530. The load elements 552, 554, 556 may also be coupled together at a node 558, which may be connected to a ground, for instance.

Figures 6A, 6B:
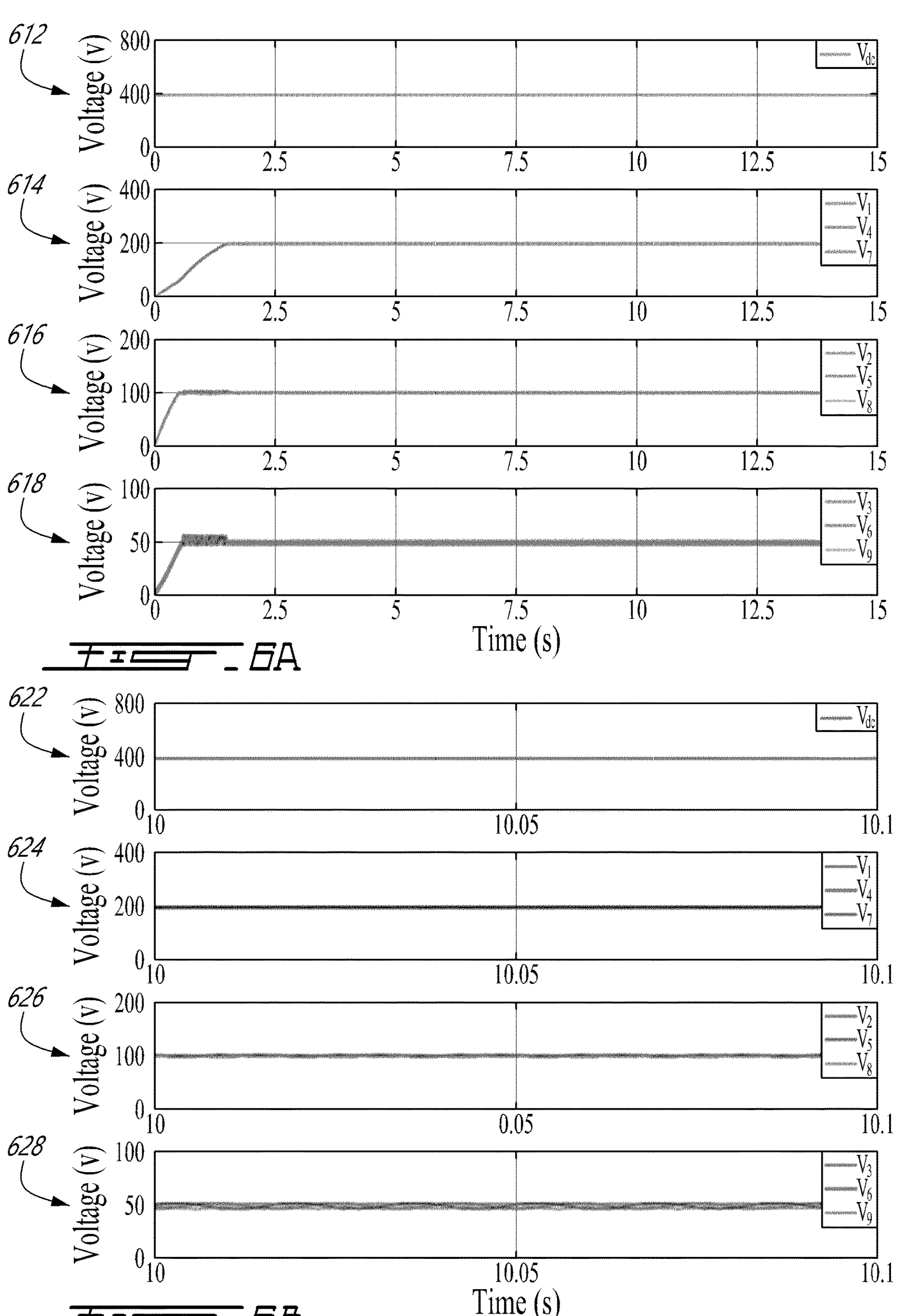
FIGS. 6A-6D illustrate example simulation results for the capacitors of the three-phase power converter topology of FIG. 3.

With reference to FIGS. 6A-6D, simulation results for the three-phase UPUC converter 300 under standard operating conditions are presented. In FIG. 6A, the voltage of the DC source 340 is presented in graph 612. Graphs 614, 616, 618 present the voltages across the capacitors 116, 126 of each of the UPUC converters 310, 320, 330 of the three-phase UPUC converter 300. Graph 614 indicates that the voltage of the capacitors 116 of the UPUC converters 310, 320, 330 is set to one half of the voltage of the DC source 340. Graphs 616, 618 indicate that the voltages of the capacitors 126 of the UPUC converters 310, 320, 330, are set to one quarter and one eighth of the voltage of the DC source 340.

In FIG. 6B, the voltages of the DC source 340 and the capacitors 116, 126 over a short time interval of 0.1 seconds are illustrated in graphs 622, 624, 626, 628. Graph 622 illustrates the voltage of the DC source 340, which is substantially flat. Graph 624 illustrates the voltages of the capacitors 116 of the UPUC converters 310, 320, 330, and graphs 626, 628 illustrate the voltages of the capacitors 126. In the illustrated embodiment, it can be observed that voltage ripples for the capacitors 116, 126 are not substantive, and that the voltages of the capacitors are balanced between charging and discharging states.

Figures 6C, 6D:
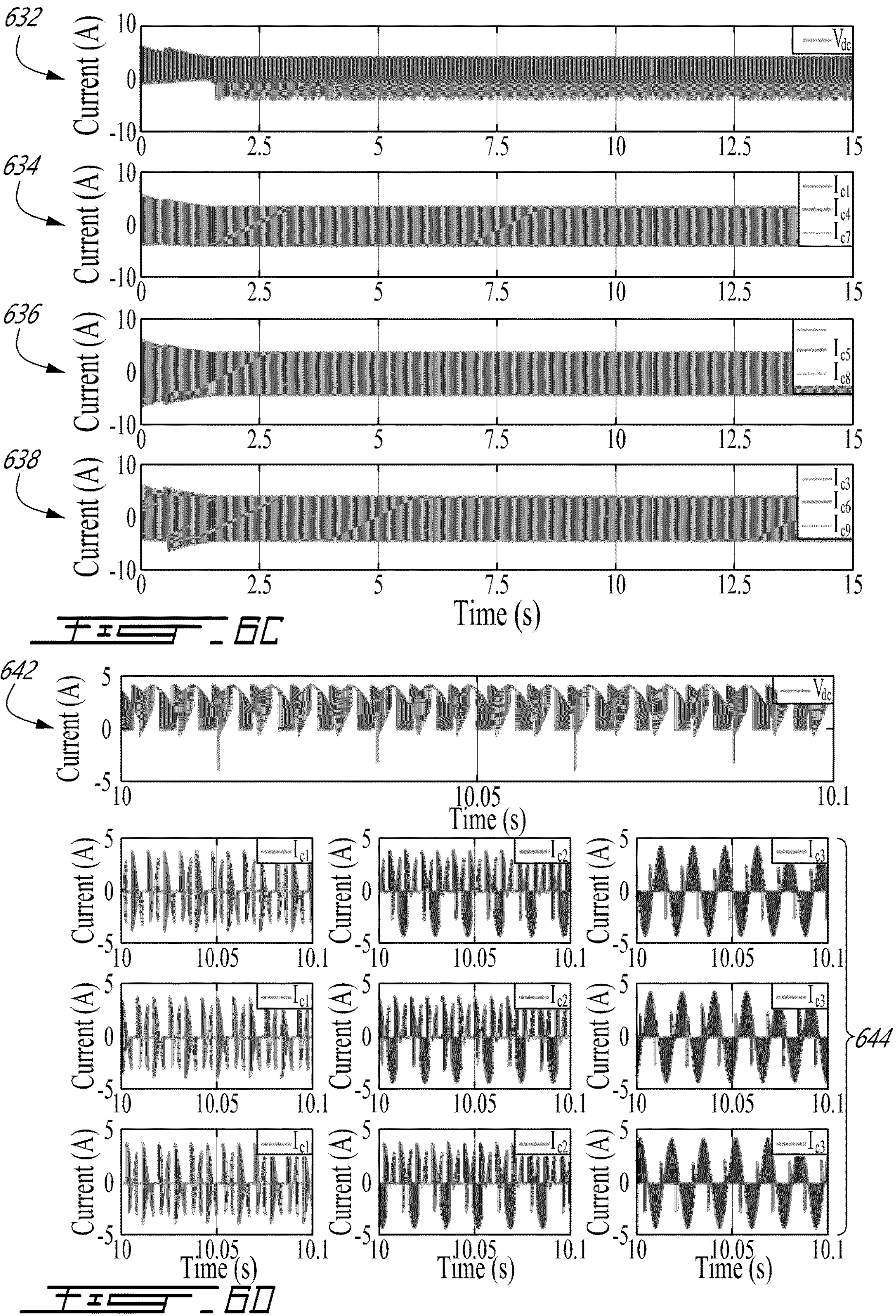

In FIG. 6C, currents for the DC source 340 and the capacitors 116, 126 are presented. Graph 632 illustrates the current of the DC source 340, and graphs 634, 636, 638 illustrate the overall currents of the capacitors 116, 126. In FIG. 6D, the currents of the DC source 340 and the capacitors 116, 126 over a short time interval of 0.1 seconds are illustrated: graph 642 illustrates the current of the DC source 340, and graphs 644 illustrate the current in the capacitors of the UPUC converters 310, 320, 330. The changes in current values in graphs 644 illustrate the switching of the switches of the UPUC converters 310, 320, 330.

Figures 7A, 7B:
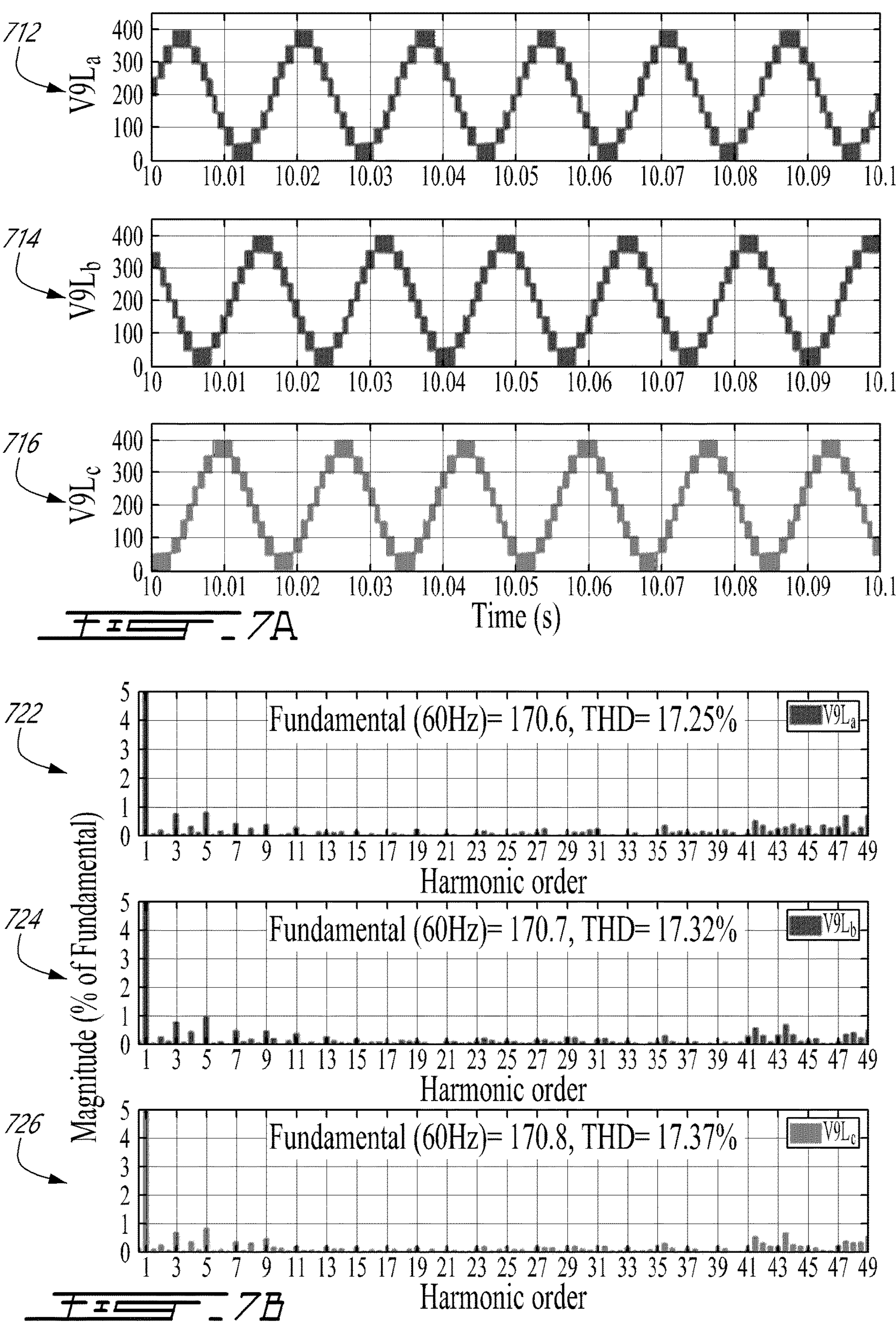
FIGS. 7A-7H illustrate example simulation results for the outputs of the three-phase power converter topology of FIG. 3.
Figures 7C, 7D:
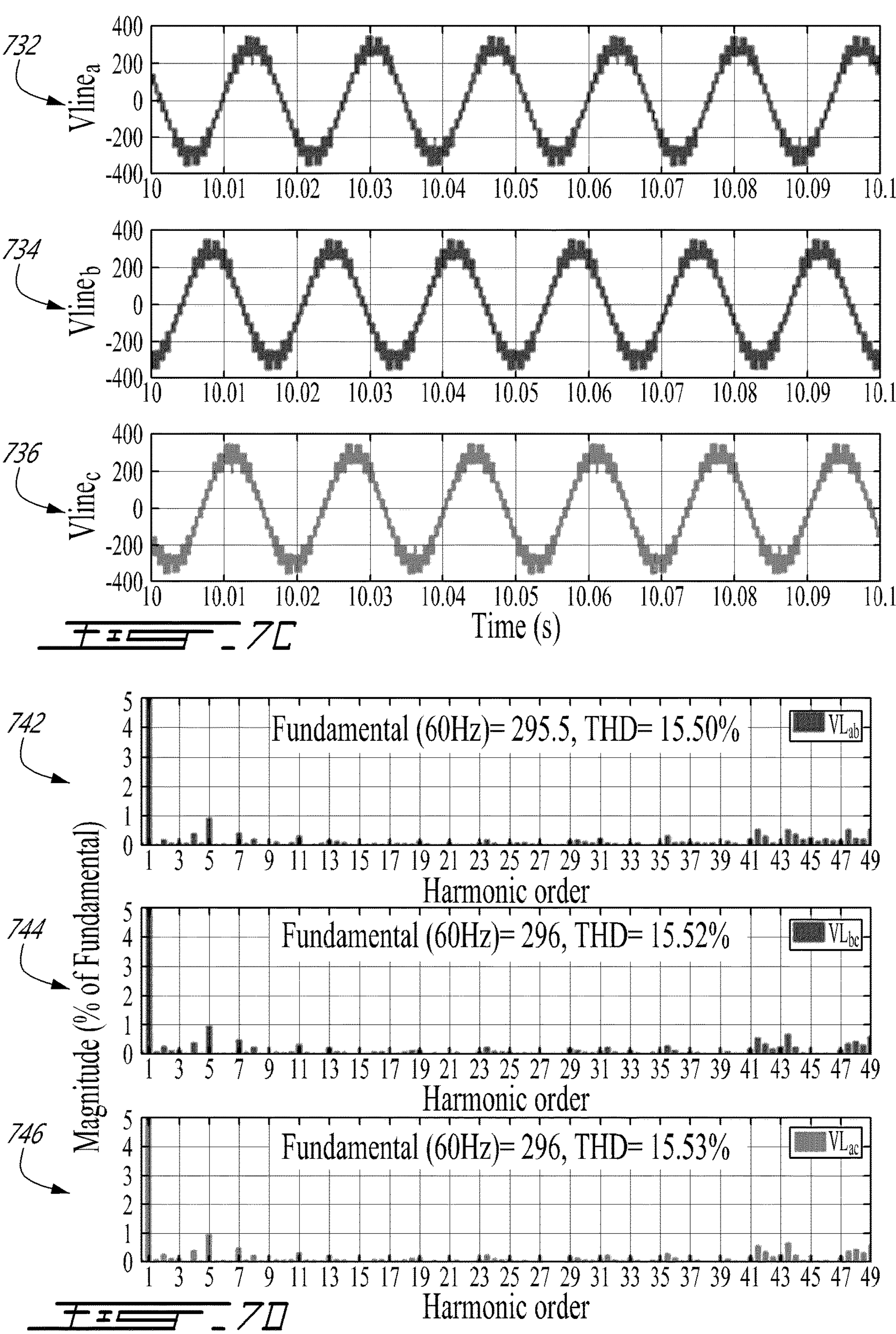
Figures 7E, 7F:
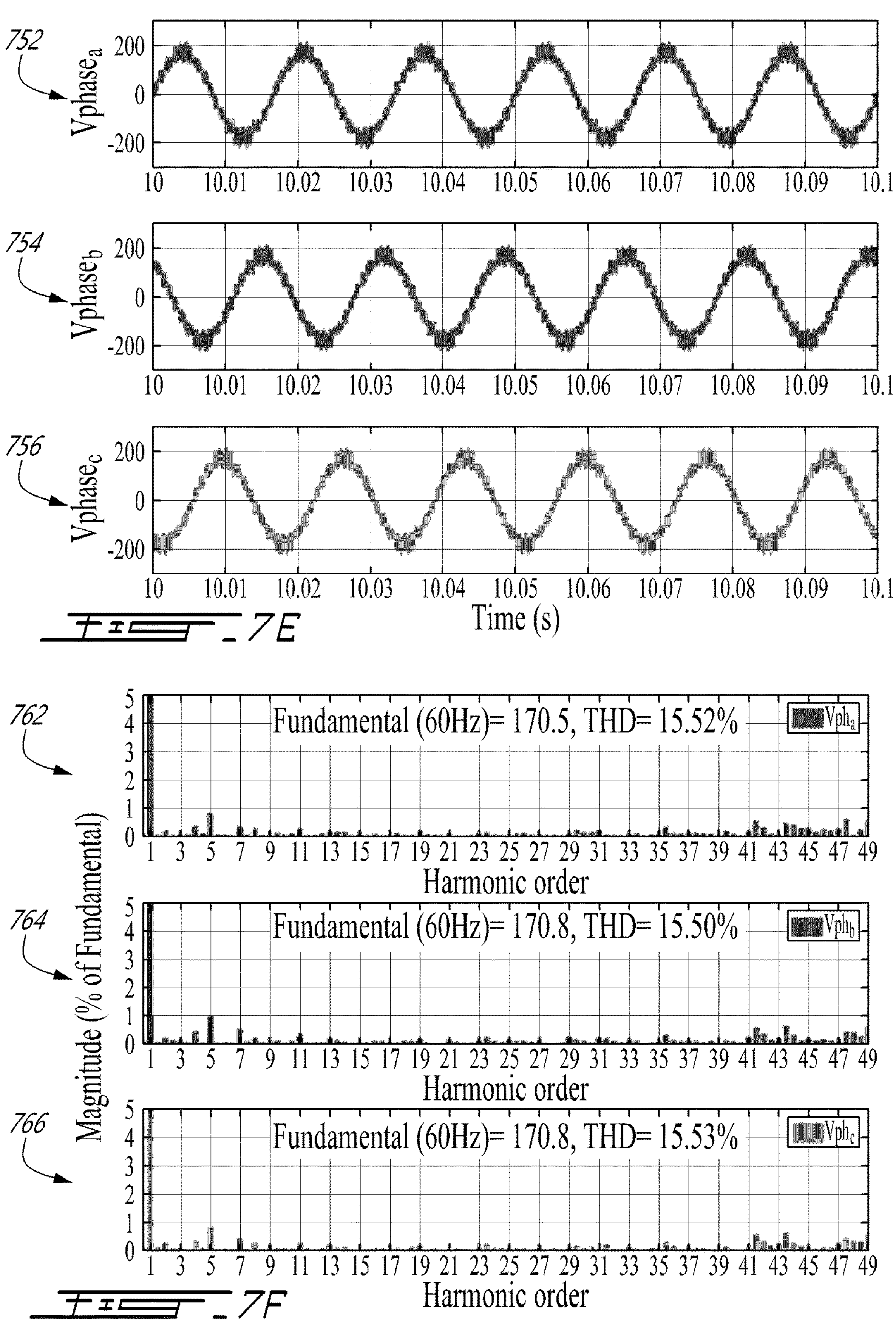
Figures 7G, 7H:
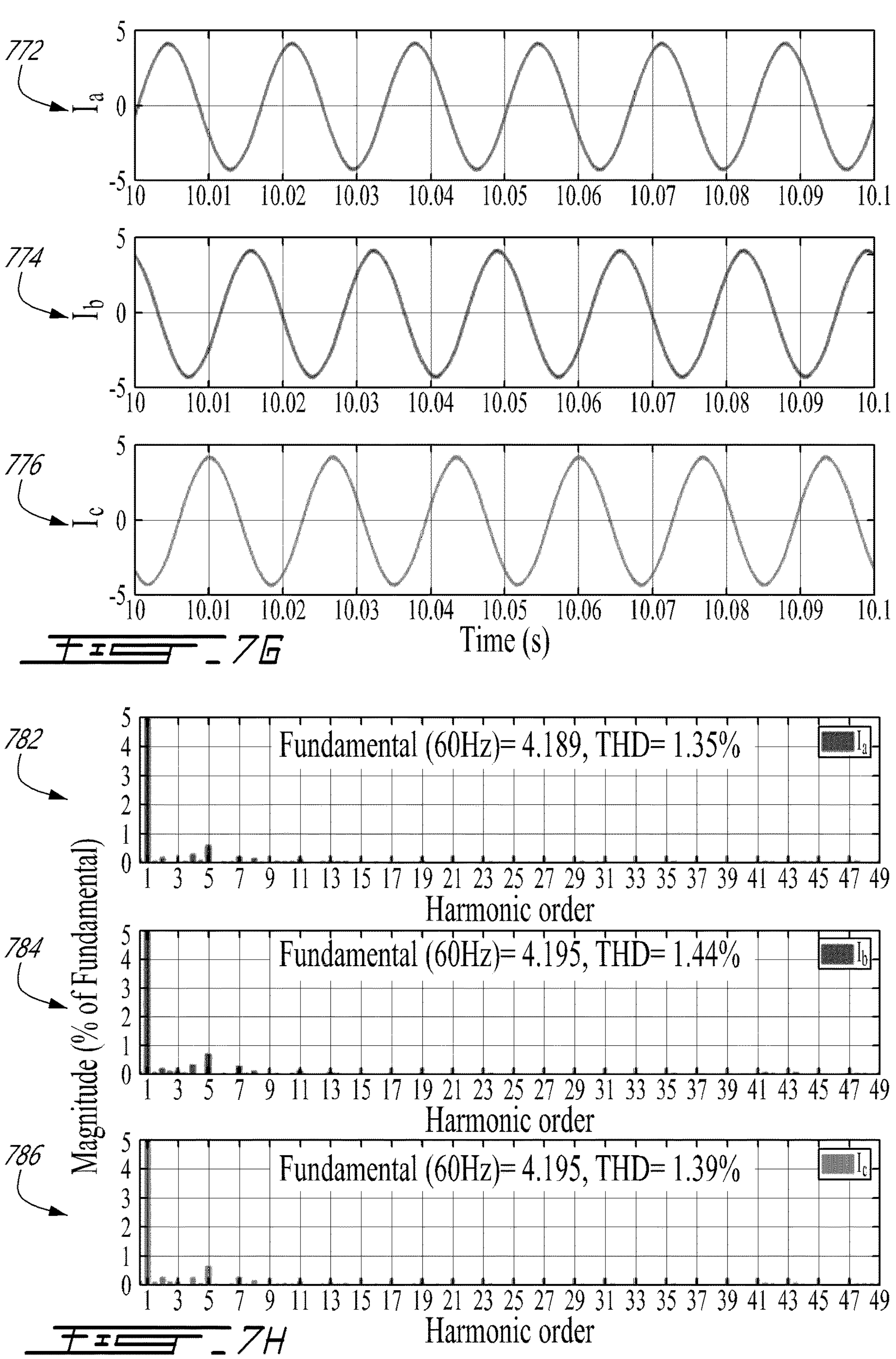

With reference to FIGS. 7A-7H, simulation results of output voltages and currents produced by the three-phase UPUC converter 300 are presented. In FIG. 7A, the output voltages at nodes 128 of the UPUC converters 310, 320, 330 are shown in graphs 712, 714, 716, respectively. In FIG. 7B, the magnitude of harmonic frequencies of the output voltages at nodes 128 of the UPUC converters 310, 320, 330 are shown in graphs 722, 724, 726, respectively. In FIG. 7C, the line voltages, which are measured between the converter phases (between points A and B, points B and C, points A and C), and are provided to the load elements 352, 354, 356 are shown in graphs 732, 734, 736, respectively. In FIG. 7D, the magnitude of harmonic frequencies of the line voltages, where the line voltages are measured between the converter phases (between points A and B, points B and C, points A and C), and are provided to the load elements 352, 354, 356 are shown in graphs 742, 744, 746, respectively. In FIG. 7E, the phase voltages which are measured across the output loads (between the points A and node 358, points B and node 358, points C and node 358) are shown in graphs 752, 754, 756, respectively. In FIG. 7F, the magnitude of harmonic content of the phase voltages, where the phase voltages are measured across the output loads (between the points A and node 358, points B and node 358, points C and node 358) are shown in graphs 762, 764, 766, respectively. In FIG. 7G, the output currents at nodes 128 of the UPUC converters 310, 320, 330 are shown in graphs 772, 774, 776, respectively. In FIG. 7H, the magnitude of harmonic content of the output currents at nodes A, B, C, respectively of the UPUC converters 310, 320, 330 are shown in graphs 782, 784, 786, respectively. As a result of the voltage outputs having 17 discrete voltages, the output currents are produced as well-defined sine waves, as shown in graphs 772, 774, 776. In addition, in some embodiments, the control technique used to produce the control signals can be used to shift harmonic distortions to higher level harmonic orders, for instance to the $67^{th}$ order.

Figures 8A, 8B:
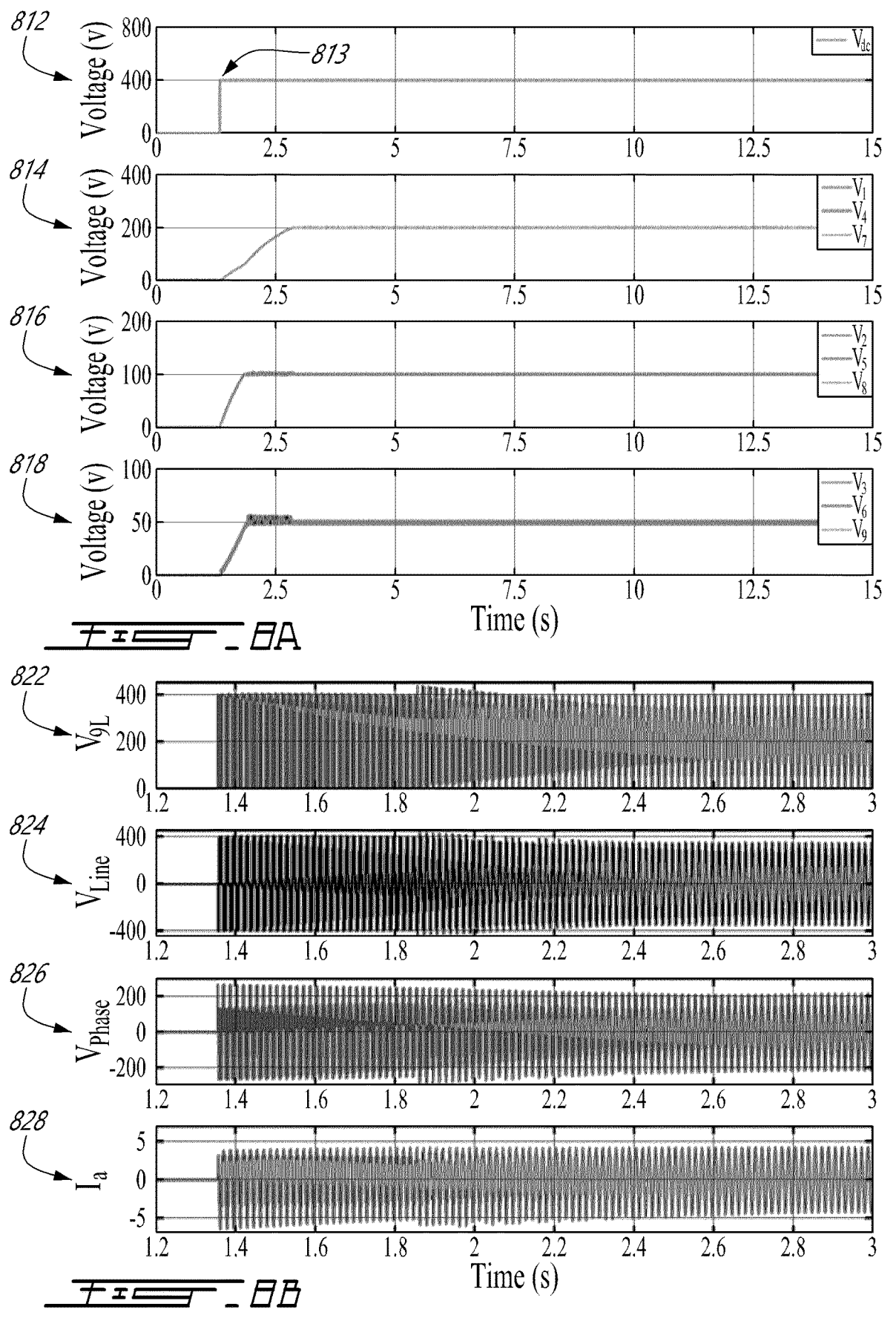
Figure 8C:
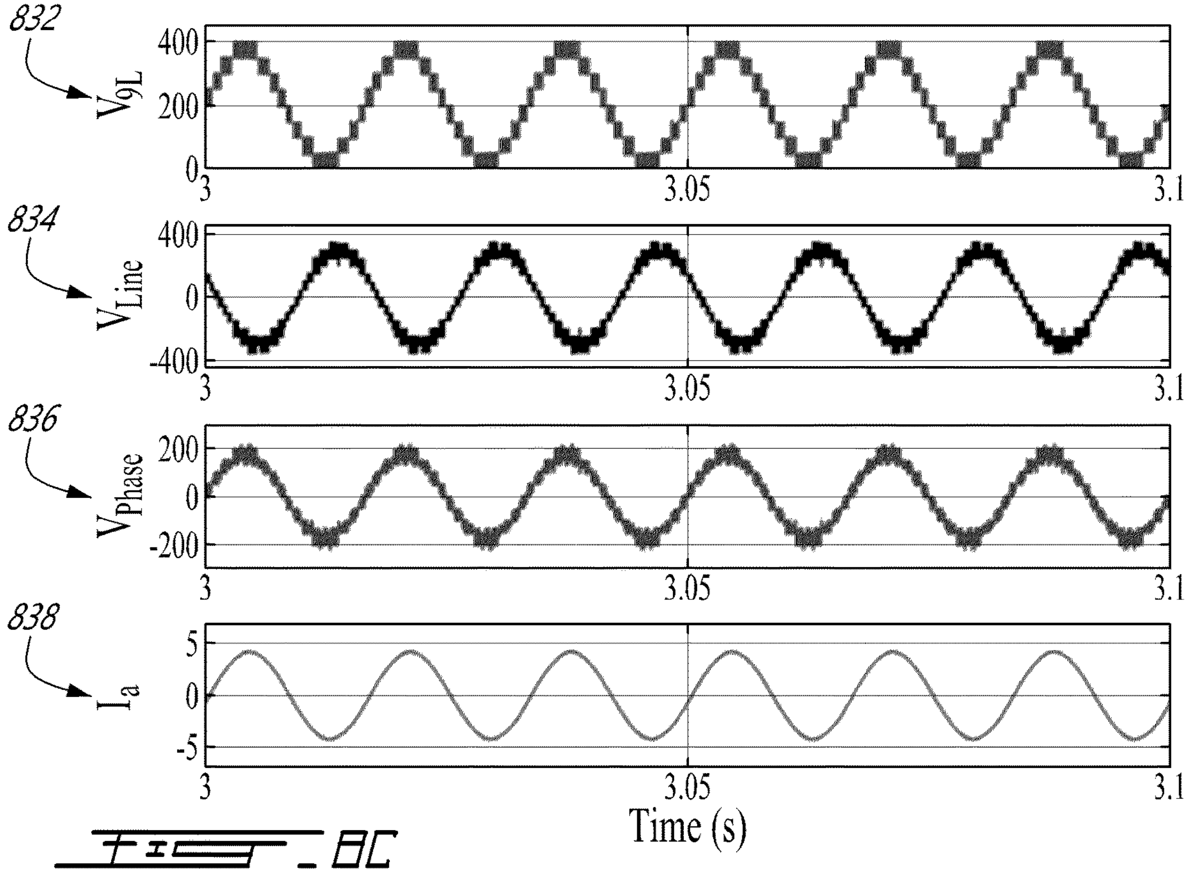

With reference to FIGS. 8A-8C, simulation results for the three-phase UPUC converter 300 during a start-up procedure are illustrated. In FIG. 8A, the voltage of the DC source 340 is presented in graph 812; as illustrated, the voltage of the DC source 340 begins at 0 V, and increases to 400 V at a time 813. Graphs 814, 816, 818 present the voltages across the capacitors 116, 126 of each of the UPUC converters 310, 320, 330 of the three-phase UPUC converter 300, which also begin at 0 V, and begin to increase after the time 813 until reaching the appropriate voltage levels ($V_{dc}/2$, $V_{dc}/4$ and $V_{dc}/8$). As can be seen, there is no requirement to pre-charge or pre-supply the capacitors 116, 126 of the UPUC converters 310, 320, 330 for proper operation of the three-phase UPUC converter 300. Rather, the capacitors 116, 126 can inherently reach the appropriate voltage levels using an appropriate control scheme for the switching states of the UPUC converters 310, 320, 330. In FIG. 8B, graph 822 illustrates the nine-level voltage, graph 824 illustrates the line voltage, graph 826 illustrates the phase voltage, and graph 828 illustrates the output current provided to the AC load 350. In FIG. 8C, the voltage and current waveforms of graphs 822-828 are presented over a short time interval: graph 832 illustrates the nine-level voltage, graph 834 illustrates the line voltage, graph 836 illustrates the phase voltage, and graph 838 illustrates the output current provided to the AC load 350.

Figures 9A, 9B:
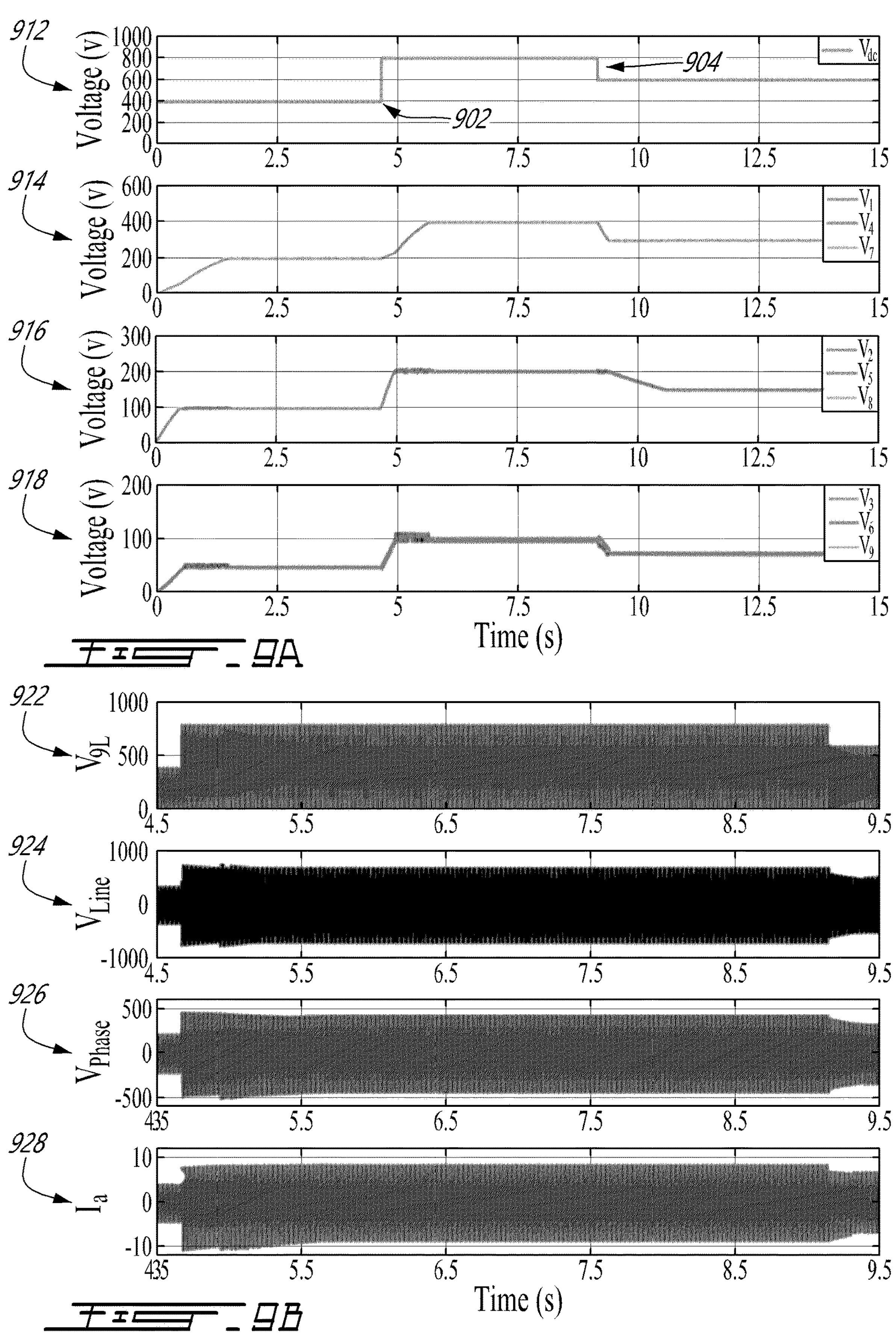
FIGS. 9A-9C illustrate example simulation results for the three-phase power converter topology of FIG. 3 during power supply voltage variation conditions.
Figure 9C:
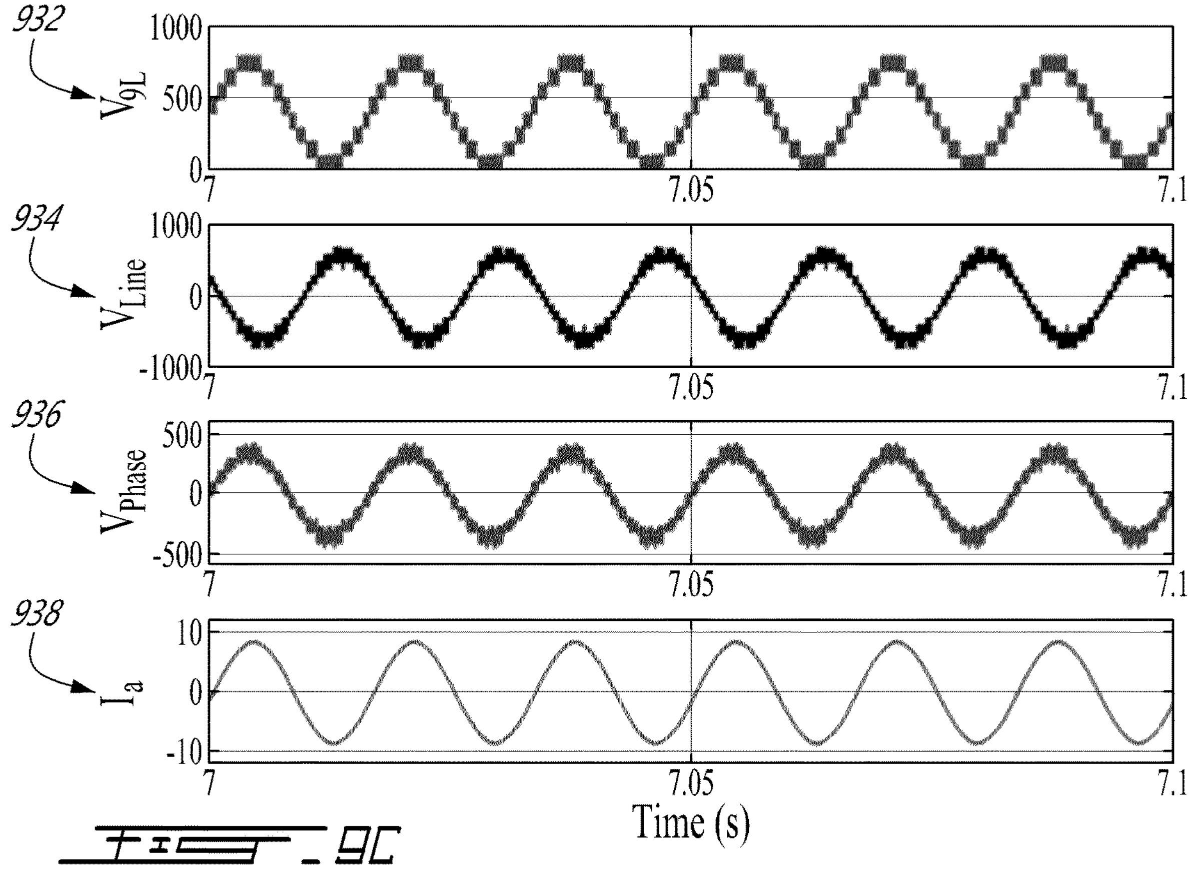

With reference to FIGS. 9A-9C, simulation results for the three-phase UPUC converter 300 during variations in the voltage supplied by the power source 340 are illustrated. In FIG. 9A, the voltage of the DC source 340 is presented in graph 912; as illustrated, the voltage of the DC source 340 begins at 400 V, increases to 800 V at a time 902, then drops to 600 V at time 904. Graphs 914, 916, 918 present the voltages across the capacitors 116, 126 of each of the UPUC converters 310, 320, 330 of the three-phase UPUC converter 300. After time 902, the voltages of the capacitors 116, 126 experience a transient and increase to accommodate the increase in the voltage of the DC source 340. After time 904, the voltages of the capacitors 116, 126 experience a transient and decrease to accommodate the decrease in the voltage of the DC source 340. In FIG. 9B, graph 922 illustrates the nine-level voltage, graph 924 illustrates the line voltage, graph 926 illustrates the phase voltage, and graph 928 illustrates the output current provided to the AC load 350. In FIG. 9C, the voltage and current waveforms of graphs 922-928 are presented over a short time interval: graph 932 illustrates the nine-level voltage, graph 934 illustrates the line voltage, graph 936 illustrates the phase voltage, and graph 938 illustrates the output current provided to the AC load 350.

With reference to FIGS. 10A-10D, simulation results for the three-phase UPUC converter 300 during variations in the AC load 350 are illustrated. For example, a change in the AC load 350 may include a variation in the linear impedance value of the AC load 350 (shown in FIGS. 10A-B), and changes in the non-linear impedance value of the AC load 350 (shown in FIGS. 10C-D). For example, the change in the non-linear impedance value of the AC load 350 can be simulated by connecting single-phase diode rectifiers to the load elements 352, 354, 356. Simulating changes in the AC load 350 may serve, for instance, to analyze the response and performance of the capacitors 116, 126 in dynamic operating conditions.

Figures 10A, 10B:
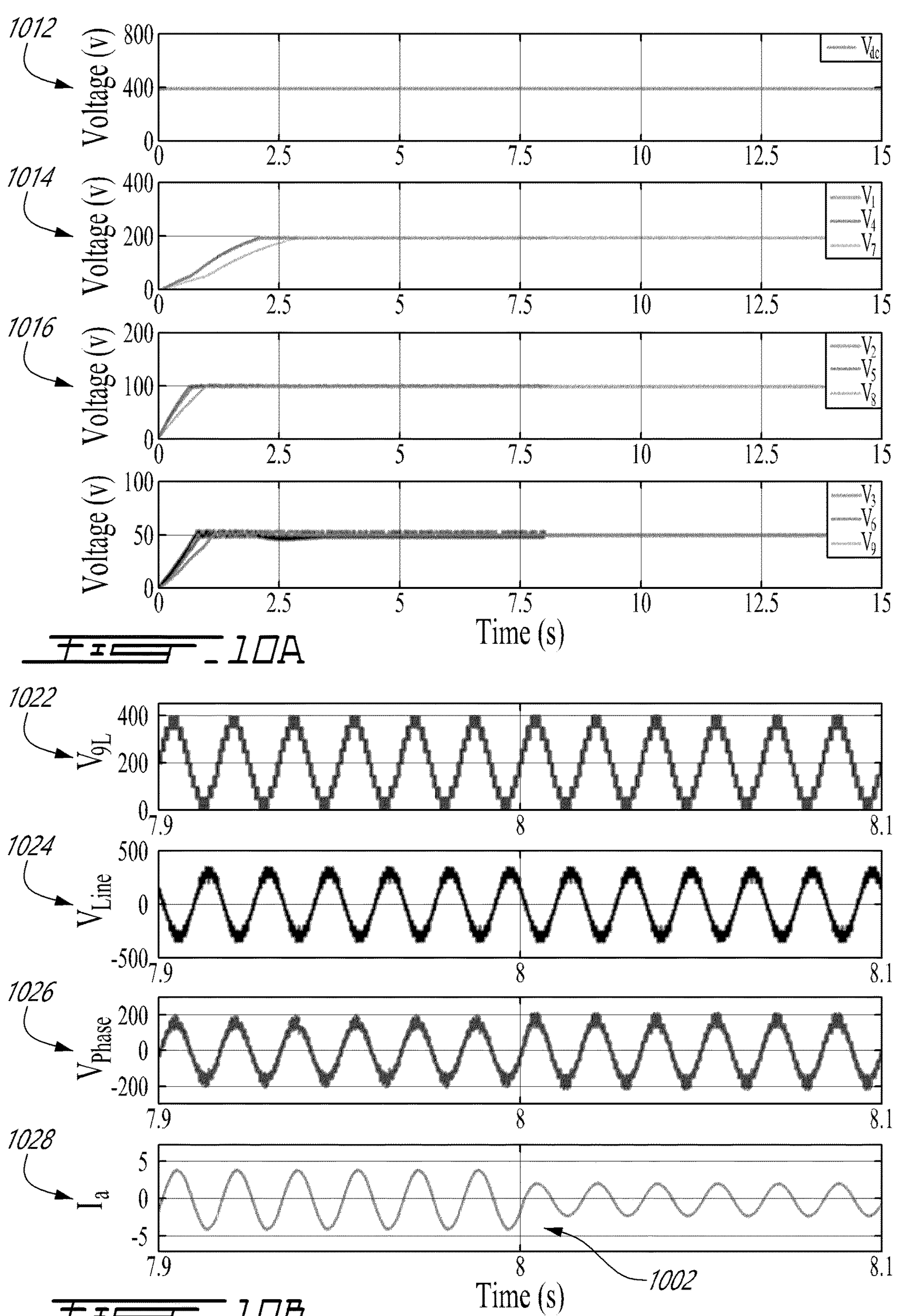
FIGS. 10A-10D illustrate example simulation results for the three-phase power converter topology of FIG. 3 during output load variation conditions.

In FIG. 10A, the voltage of the DC source 340 is presented in graph 1012, and graphs 1014, 1016, 1018 present the voltages across the capacitors 116, 126 of each of the UPUC converters 310, 320, 330 of the three-phase UPUC converter 300. As shown in graphs 1014, 1016, 1018, the voltages of the capacitors 116, 126 do not exhibit substantive voltage transients or ripples during linear changes in the AC load 350. In FIG. 10B, graph 1022 illustrates the nine-level voltage, graph 1024 illustrates the line voltage, graph 1026 illustrates the phase voltage, and graph 1028 illustrates the output current provided to the AC load 350. As can be seen in graph 1028, the output current provided to the AC load 350 decreases at time 1002, due to the change in the AC load 350. The general form of the output current in graph 1028 does not deviate from the well-defined sine wave shape, and the nine-level, line, and phase voltage waveforms do not exhibit any substantive transient states.

Figures 10C, 10D:
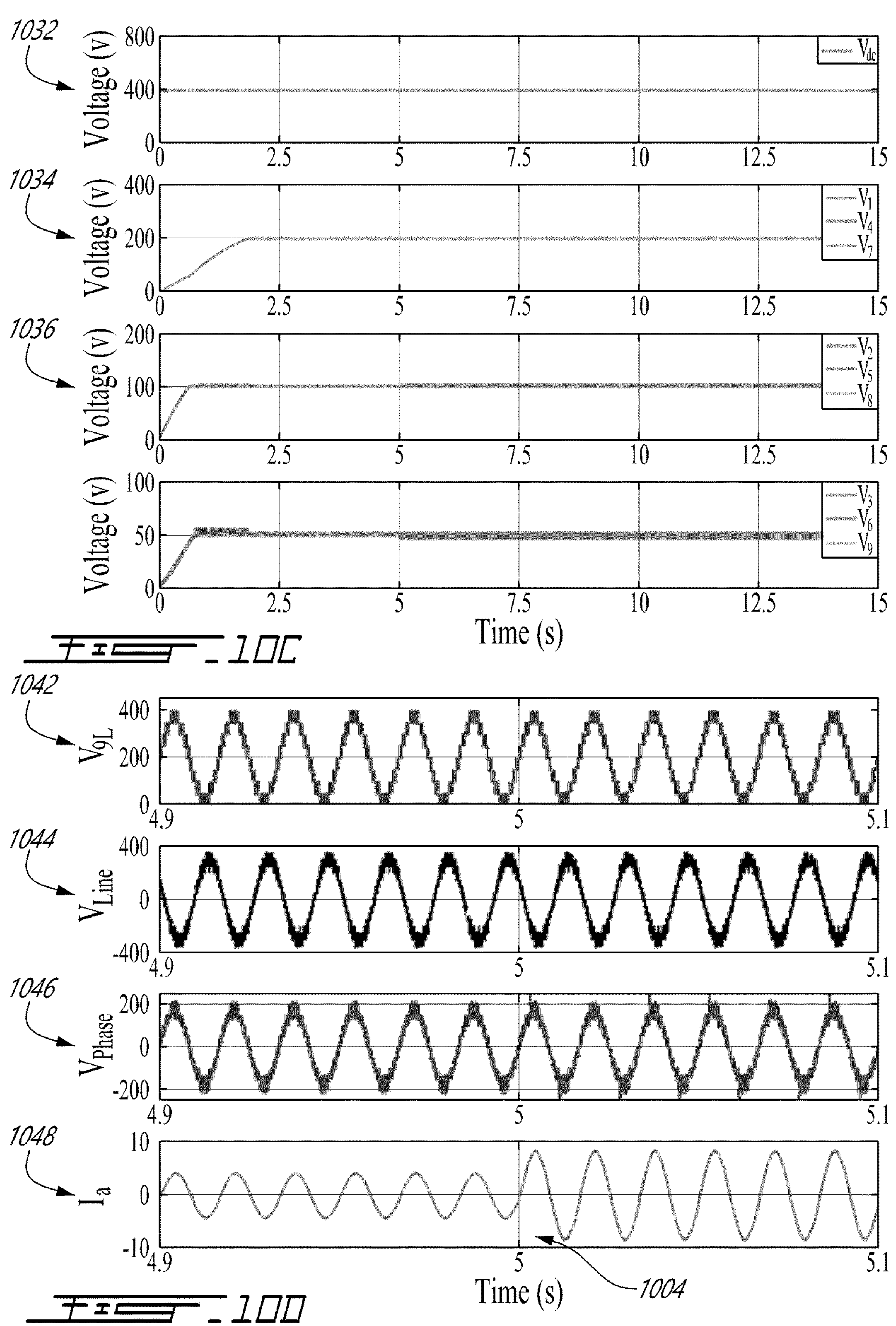

In FIG. 10C, the voltage of the DC source 340 is presented in graph 1032, and graphs 1034, 1036, 1038 present the voltages across the capacitors 116, 126 of each of the UPUC converters 310, 320, 330 of the three-phase UPUC converter 300. As shown in graphs 1034, 1036, 1038, the voltages of the capacitors 116, 126 do not exhibit substantive voltage transients or ripples during non-linear changes in the AC load 350. In FIG. 10D, graph 1042 illustrates the nine-level voltage, graph 1044 illustrates the line voltage, graph 1046 illustrates the phase voltage, and graph 1048 illustrates the output current provided to the AC load 350. As can be seen in graph 1048, the output current provided to the AC load 350 increases at time 1004, due to the change in the AC load 350. The general form of the output current in graph 1048 does not deviate from the well-defined sine wave shape, and the nine-level, line, and phase voltage waveforms do not exhibit any substantive transient states.

Figures 11A, 11B:
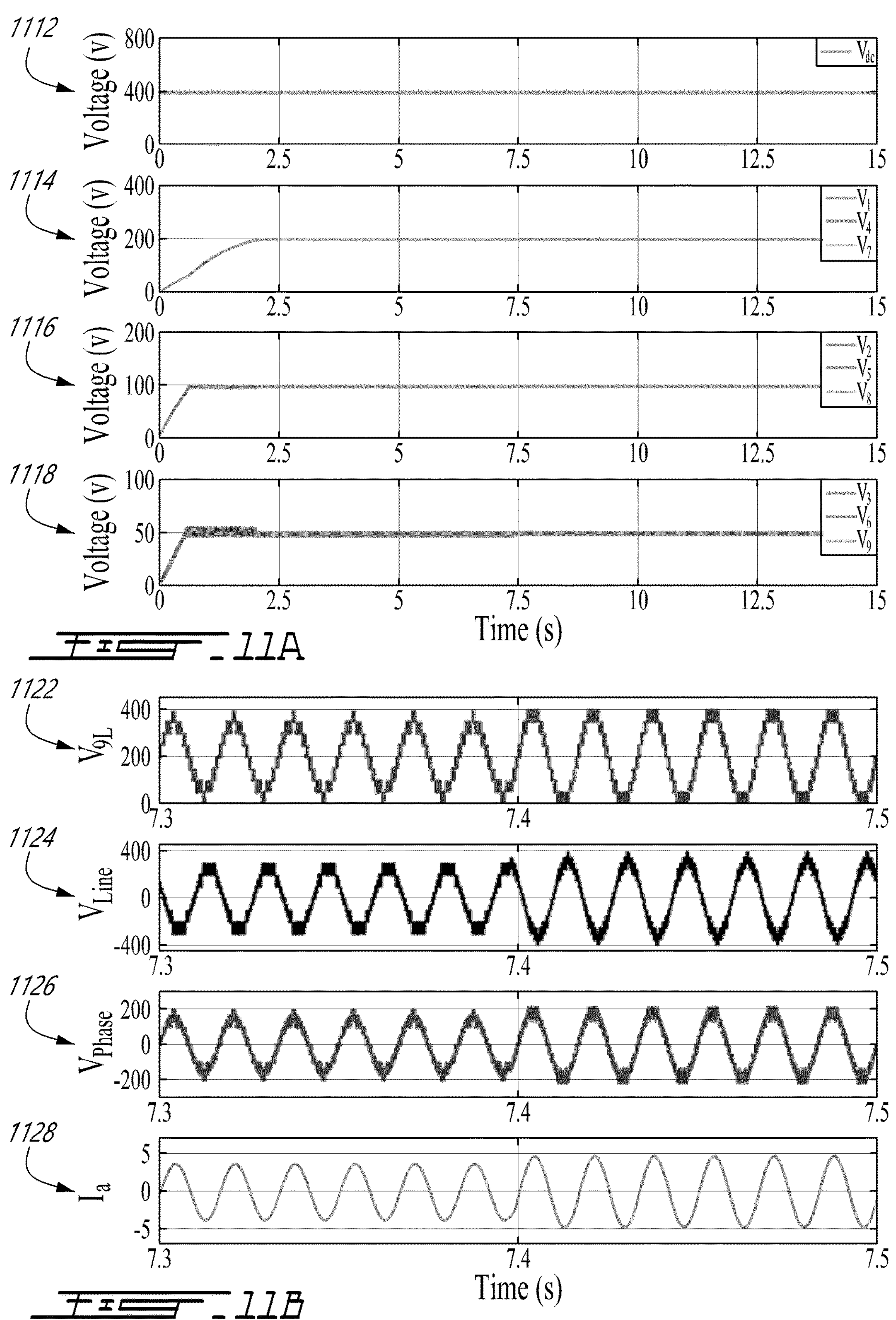
FIGS. 11A-11D illustrate example simulation results for the three-phase power converter topology of FIG. 3 during varying operational conditions.

With reference to FIGS. 11A-11B, simulation results for the three-phase UPUC converter 300 during variations in an amplitude modulation index, used to produce the control signals provided to the switches of the three-phase UPUC converter 300, are illustrated. In the illustrated example, the amplitude modulation index is changed from 0.75 to 0.95. Simulating changes in the amplitude modulation index may serve, for instance, to analyze the response and performance of the capacitors 116, 126 to different pulse widths used for the control signals. In FIG. 11A, the voltage of the DC source 340 is presented in graph 1112. Graphs 1114, 1116, 1118 present the voltages across the capacitors 116, 126 of each of the UPUC converters 310, 320, 330 of the three-phase UPUC converter 300. As shown in graphs 1114, 1116, 1118, the voltages of the capacitors 116, 126 do not exhibit substantive voltage transients or ripples during changes in the amplitude modulation index. In FIG. 11B, graph 1122 illustrates the nine-level voltage, graph 1124 illustrates the line voltage, graph 1126 illustrates the phase voltage, and graph 1128 illustrates the output current provided to the AC load 350. As shown in graphs, 1122, 1124, 1126, the change in the amplitude modulation index results in a change of the amplitude of the nine-level, line, and phase voltages, which also retain their sine wave shape, and do not exhibit any substantive transient states. The graph 1128 indicates that the output current provided to the AC load 350 increases as a result of the change in the amplitude modulation index.

Figures 11C, 11D:
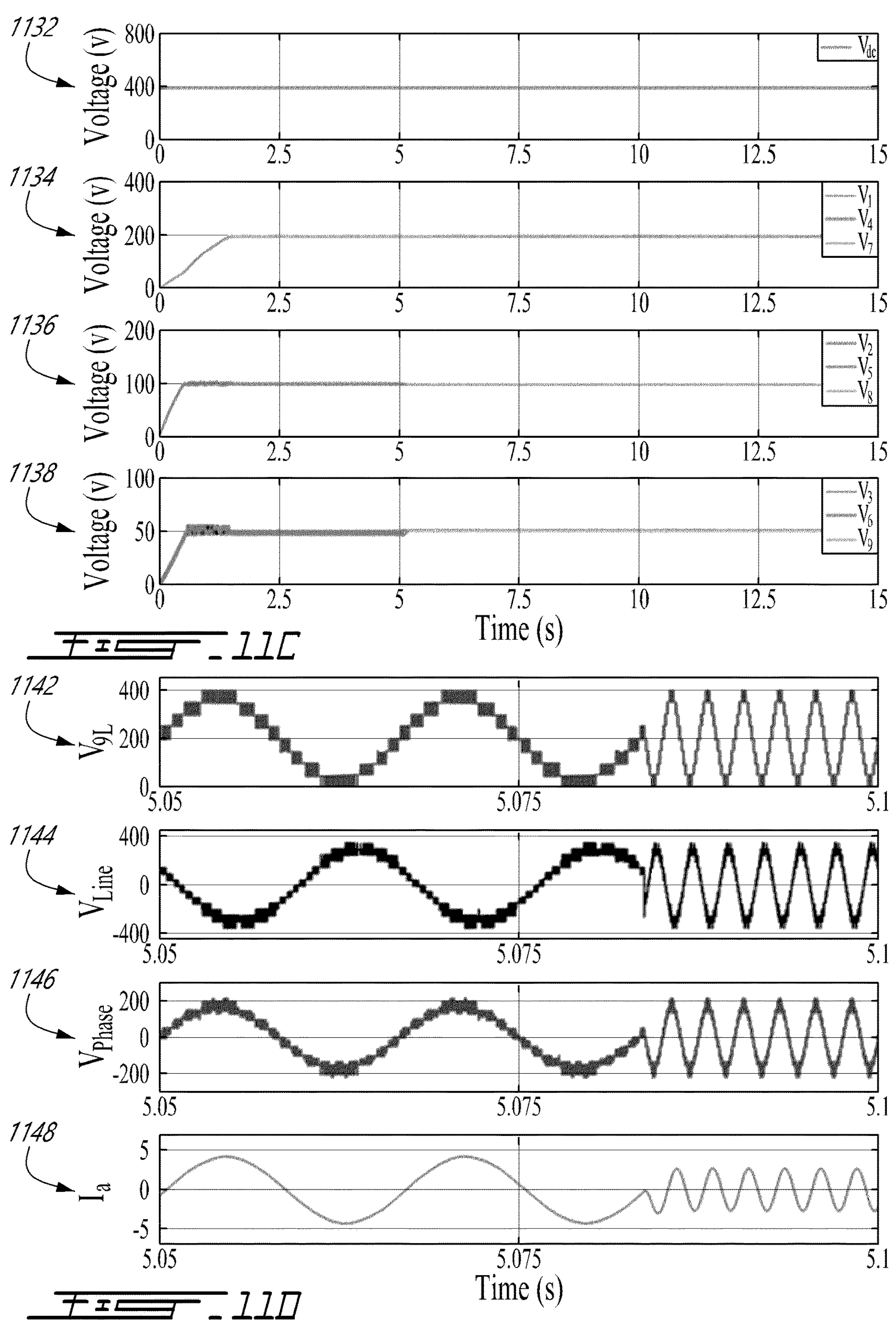

With reference to FIGS. 11C-11D, simulation results for the three-phase UPUC converter 300 during variations in a fundamental frequency of operation are illustrated. In the illustrated example, the fundamental frequency is changed from 60 Hz to 400 Hz. To account for the changes in the fundamental frequency, the switching frequency of the switches of the UPUC converter 300 is simulated as 12 KHz. In FIG. 11C, the voltage of the DC source 340 is presented in graph 1132. Graphs 1134, 1136, 1138 present the voltages across the capacitors 116, 126 of each of the UPUC converters 310, 320, 330 of the three-phase UPUC converter 300. As shown in graphs 1134, 1136, 1138, the voltages of the capacitors 116, 126 do not exhibit substantive voltage transients or ripples during the change in the fundamental frequency. In FIG. 11D, graph 1142 illustrates the nine-level voltage, graph 1144 illustrates the line voltage, graph 1146 illustrates the phase voltage, and graph 1148 illustrates the output current provided to the AC load 350. As shown in graphs, 1142, 1144, 1146, the change in the fundamental frequency results in a change of the frequency of the nine-level, line, and phase voltages, which also retain their sine wave shape, and do not exhibit any substantive transient states. The graph 1128 indicates that the output current provided to the AC load 350 changes in frequency and amplitude as a result of the change in the fundamental frequency.

The foregoing paragraphs relating to simulation results for the three-phase UPUC converter 300 discuss particular simulations results relating to particular testing scenarios. In particular, the DC source 340 was selected with $V_{dc}$=400 V, the load elements 352, 354, 356 were modeled as inducing both linear and non-linear loads with fundamental and switching frequencies of 60 Hz and 4 KHz, respectively. The linear load were selected as being composed of resistance and inductance parts (R-L) configured as R=40 Ω and L=20 mH, and the non-linear load was modeled as a diode rectifier having an output connected to the linear load with same configuration as the linear loads. The changes in the AC load 350 included changing from R=40Ω and L=20 mH to R=80Ω and L=10 mH substantially simultaneously. The capacitances of the capacitors 116, 126 of each of the UPUC converters 310, 320, 330 of the three-phase UPUC converter 300 were modeled as being identical for all phases, namely $C_{1-10}$=2500 uF.

The foregoing discussion provides many example embodiments. Although each embodiment represents a single combination of one or more embodiments and/or elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims. The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps. The scope of the following claims should not be limited by the embodiments set forth in the examples, but should be given the broadest reasonable interpretation consistent with the description as a whole.

The invention claimed is:

1. A power converter for transforming electrical power between direct current (DC) power and alternating current (AC) power, comprising:

a first stage comprising a first branch having a first pair of series-connected switches, a second branch having a second pair of series-connected switches, and a capacitor connected between the first and second branches, wherein each of the first pair and the second pair of series-connected switches comprises a first switch and a second switch, and further wherein one of a DC source and a DC load is connectable to a first node connected to the second switch of the first pair of series-connected switches and to a second node connected to the second switch of the second pair of series-connected switches, the second node being a neutral point of the power converter;

a second stage comprising a third branch having a first plurality of series-connected switches, a fourth branch having a second plurality of series-connected switches, and a plurality of capacitors connected between the third and fourth branches at respective connection points located between intermediate switches of the first and second pluralities of series-connected switches; and a connection branch coupling the first stage and the second stage.

2. The power converter of claim 1, wherein the first plurality of series-connected switches comprises a first group of three switches, wherein the second plurality of series-connected switches comprises a second group of three switches, and wherein the plurality of capacitors comprises first and second capacitors, wherein the first capacitor is connected between a first switch and a second switch of the first group of three switches and between a first switch and a second switch of the second group of three switches, and wherein the second capacitor is connected between the second switch and a third switch of the first group of three switches and between the second switch and a third switch of the second group of three switches.

3. The power converter of claim 1, wherein the first plurality of series-connected switches comprises a first group of N switches, wherein the second plurality of series-connected switches comprises a second group of N switches, and wherein the plurality of capacitors comprises N-1 capacitors.

4. The power converter of claim 1, wherein the DC source is connectable to the first node and to the second node, and further wherein an AC load is connectable to the second node and to a common node connecting the first switch of the first group of three switches and the first switch of the second group of three switches.

5. The power converter of claim 1, wherein the connection branch is connected between a first common node and a second common node, the first common node connecting the first switch of the first pair of series-connected switches and the first switch of the second pair of series-connected switches, and the second common node connecting the third switch of the first group of three switches and the third switch of the second group of three switches.

6. The power converter of claim 1, wherein the DC load is connectable to the first node and to the second node, and further wherein an AC source is connectable to the second node and to a common node connecting the first switch of the first group of three switches and the first switch of the second group of three switches.

7. The power converter of claim 1, wherein the first pair of series-connected switches is configured to operate complementarily with the second pair of series-connected switches, and the first plurality of series-connected switches is configured to operate complementarily with the second plurality of series-connected switches for defining a plurality of distinct switching states producing different voltage levels at an output of the power converter.

8. The power converter of claim 7, wherein the first and the second pair of series-connected switches, and the first and the second plurality of series-connected switches are configured to operate for defining twenty-six switching states producing nine voltage levels at the output of the power converter.

9. A three-phase power converter for transforming electrical power between direct current (DC) power and alternating current (AC) power, comprising first, second, and third power converters according to claim 1, wherein the first, second, and third power converters are connected to a first common node connectable to a DC system, to a second common node as a neutral point of the three-phase converter, and to a third common node connectable to an AC system.

10. The three-phase power converter of claim 9, wherein, for each of the first, second, and third power converters, the first plurality of series-connected switches comprises a first group of at least three switches, the second plurality of series-connected switches comprises a second group of at least three switches, and each capacitor of the plurality of capacitors is connected between a pair of adjacent switches of the first group of switches and a corresponding pair of adjacent switches of the second group of switches.

11. The three-phase power converter of claim 9, wherein the first common node is connectable to the DC system comprising the DC source.

12. The three-phase power converter of claim 9, wherein the third common node is connectable to the AC system comprising three AC load elements, each AC load element associated with a respective phase and connected to a respective one of the first, second, and third power converters.

13. The three-phase power converter of claim 9, wherein, for each of the first, second, and third power converters, the first plurality of series-connected switches comprises a first group of three switches and the second plurality of series-connected switches comprises a second group three switches.

14. The three-phase power converter of claim 9, wherein, for each of the first, second, and third power converters, the first plurality of series-connected switches comprises a first group of more than three switches and the second plurality of series-connected switches comprises a second group of more than three switches.

15. The three-phase power converter of claim 13, wherein, for each of the first, second, and third power converters, the second stage comprises a half-bridge inverter connected to a switching cell, the half-bridge inverter comprising a first switch of the first group of switches, a first switch of the second group of switches, and a first capacitor of the plurality of capacitors connected therebetween, and the switching cell comprising a second and a third switch of the first group of switches, a second and a third switch of the second group of switches, and an intermediate branch therebetween, the intermediate branch comprising remaining ones of the plurality of capacitors and a pair of bidirectional switches.

16. The three-phase power converter of claim 15, wherein the switching cell is connected to the half-bridge inverter with the third branch and the fourth branch each connecting to the half-bridge inverter on opposing terminals of the first capacitor.

17. The three-phase power converter of claim 15, wherein the intermediate branch comprises a capacitor branch formed by a second capacitor and a third capacitor of the plurality of capacitors, the capacitor branch connected between the third branch and the fourth branch at points located between the second and the third switch of the first group of switches and between the second and the third switch of the second group of switches.

18. The three-phase power converter of claim 17, wherein the bidirectional switches of the intermediate branch are connected between the capacitor branch and the third and fourth branch to divide the second capacitor and the third capacitor of the capacitor branch.

* * * * *